US012783992B2

(12) United States Patent
Von Drasek

(10) Patent No.: US 12,783,992 B2
(45) Date of Patent: Nov. 3, 2026

(54) METHOD AND APPARATUS FOR PRODUCT INVENTORY CONTROL AND PERFORMANCE OPTIMIZATION

(71) Applicant: Buckman Laboratories International, Inc., Memphis, TN (US)

(72) Inventor: William Von Drasek, Oak Forest, IL (US)

(73) Assignee: Buckman Laboratories International, Inc., Memphis, TN (US)

(*) Notice: Subject to any disclaimer, the term of this patent is extended or adjusted under 35 U.S.C. 154(b) by 237 days.

(21) Appl. No.: 17/715,452

(22) Filed: Apr. 7, 2022

(65) Prior Publication Data

US 2022/0335371 A1 Oct. 20, 2022

Related U.S. Application Data

(60) Provisional application No. 63/278,809, filed on Nov. 12, 2021, provisional application No. 63/171,678, filed on Apr. 7, 2021.

(51) Int. Cl.
*G06Q 10/087* (2023.01)
*B67D 3/00* (2006.01)

(52) U.S. Cl.
CPC ......... *G06Q 10/087* (2013.01); *B67D 3/0003* (2013.01); *B67D 3/0093* (2013.01)

(58) Field of Classification Search
CPC .. G06Q 10/087; G06Q 20/18; G06Q 30/0621; G06Q 30/0631; G06Q 30/0641; B67D 3/0003; B67D 3/0093; B67D 1/0041; B67D 1/07; B67D 2210/0001; B67D 1/0021; B67D 1/0029; B67D 1/0888; B67D 1/00; B67D 1/0037; B67D 1/0882;
(Continued)

(56) References Cited

U.S. PATENT DOCUMENTS 5,233,867 A * 8/1993 Richardson ............... G01P 5/04 73/186
9,051,163 B2 * 6/2015 Mehus ................... B67D 7/303
(Continued)

FOREIGN PATENT DOCUMENTS

CN 112345159 A * 2/2021 ........... G01L 19/143
JP 2006153712 A * 6/2006
WO WO-2015066594 A1 * 5/2015 ........... B67D 1/0871

*Primary Examiner* — Avia Salman
(74) *Attorney, Agent, or Firm* — Baker, Donelson, Bearman, Caldwell & Berkowitz, PC

(57) ABSTRACT

A chemical product consumption monitoring device using force sensors integrated into a sealed sensor housing for retrofit installation on liquid or solid product chemical feeding systems used in water treatment. The sensor design is flexible and can be used with products having different form factors such as discs, bottles, pellets, or pails. The sensor is used to monitor the product consumption rate based on weight or percentage for inventory management by forecasting replenishment scheduling and provide a process for automatic ordering. By combining the product consumption measurement with other sensor data from the dispenser, chemical delivery system, or process, allows tracking dispenser performance and alarming if malfunctioning. Additionally, using data from different sources provides remote visibility for scheduling maintenance and troubleshooting.

14 Claims, 21 Drawing Sheets

(58) Field of Classification Search
CPC ...... B67D 1/10; B67D 1/1277; B67D 3/0025; G01F 9/003; G01G 11/02; G01G 11/04; G01G 11/06; G01G 13/024; G08B 13/1472; H05B 6/6464; H01L 27/1112; H01L 224/7592; H01L 2224/7692; H01L 2224/7792; H01L 2224/7892; H01L 2224/7992; G01D 11/245; E03B 3/28; B08B 2209/032; B08B 9/0321; B67C 2003/2671; B67C 3/001; B67C 3/20; B67C 3/26; B67C 7/00; B01F 21/22; B01F 35/20; B01F 35/2117; B01F 35/2211; B01F 35/881; C02F 1/688; C02F 1/283; C02F 1/32; C02F 1/44; C02F 1/68; C02F 2101/20; C02F 2101/30; C02F 2201/3225; C02F 2201/3228; C02F 2209/005; C02F 2209/40; C02F 2209/42; C02F 2209/44; C02F 2301/046; C02F 9/20; C11D 1/008; C11D 1/72; C11D 1/722; C11D 1/825; C11D 2111/14; C11D 3/044; C11D 3/10; C11D 3/3707; B05B 12/006; B05B 15/50; B05B 5/16
USPC ........................................................... 705/28
See application file for complete search history.

(56) References Cited

U.S. PATENT DOCUMENTS

| | | | | |
|---|---|---|---|---|
| 10,222,279 B1 * | 3/2019 | Legrand, III | ............. | G01L 1/20 |
| 2005/0000902 A1 * | 1/2005 | Newenhizen | .......... | B01D 3/346<br>210/96.1 |
| 2020/0013002 A1 * | 1/2020 | Hayashi | ................. | G01G 23/18 |
| 2022/0000306 A1 * | 1/2022 | Brandsma | ............... | A47J 31/36 |

* cited by examiner

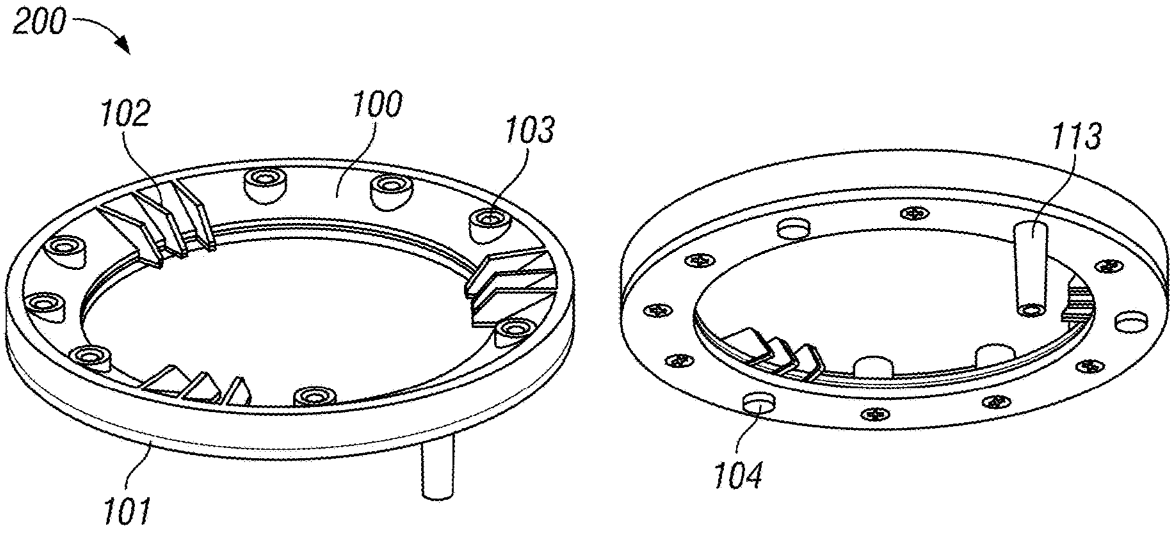
(A) *Fig. 2* (B)
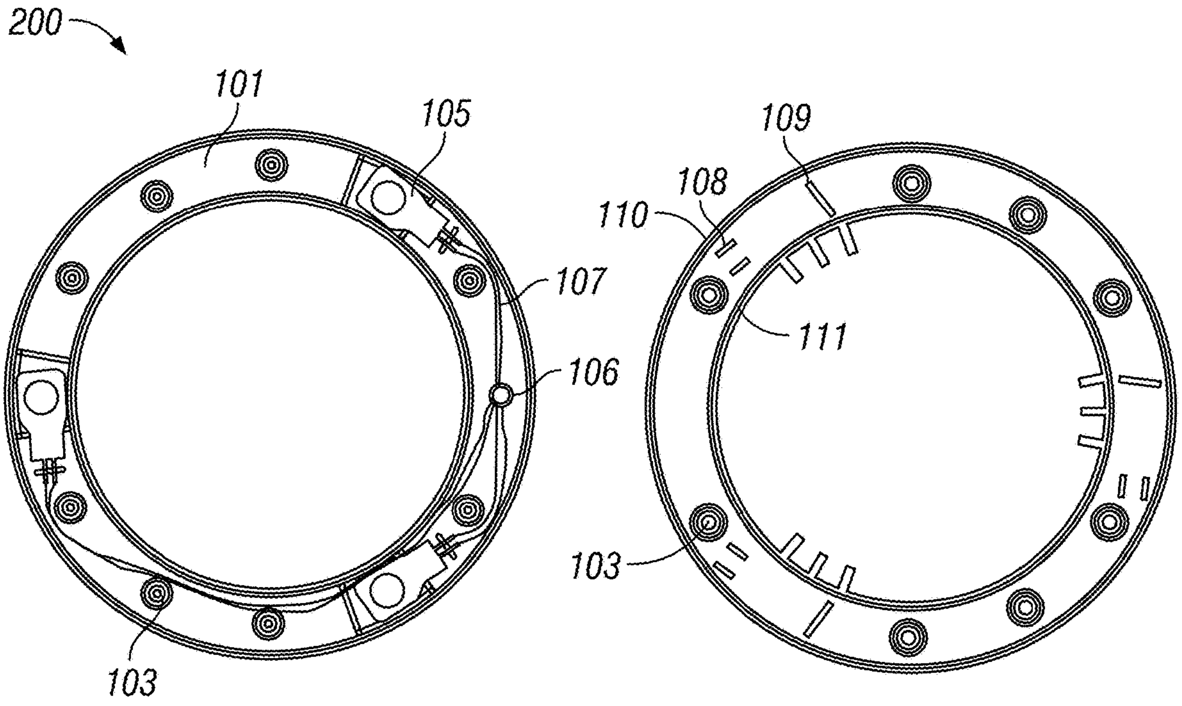
(A) (B)
*Fig. 3*

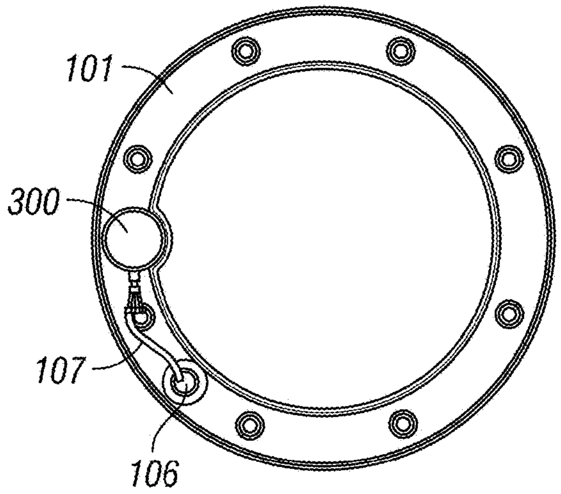
(A)
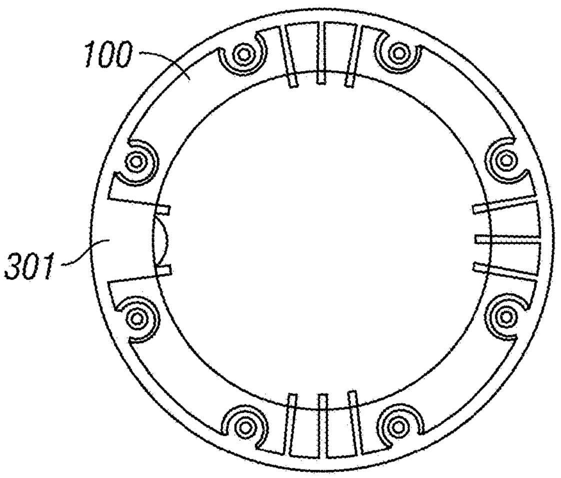
(B)
*Fig. 14*
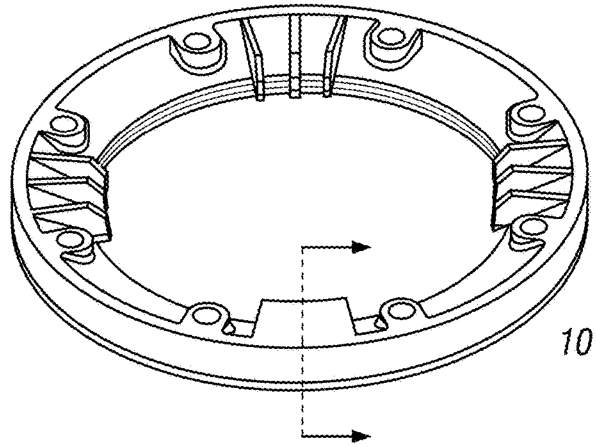
(A)
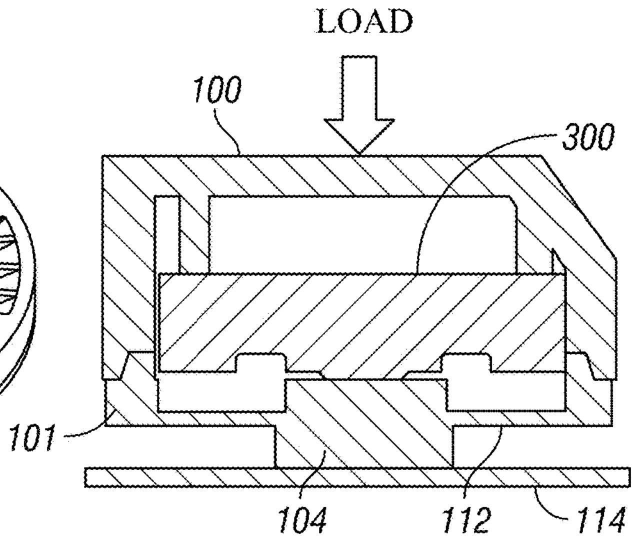
(B)
*Fig. 15*

METHOD AND APPARATUS FOR PRODUCT INVENTORY CONTROL AND PERFORMANCE OPTIMIZATION

CROSS REFERENCE TO RELATED APPLICATIONS

This nonprovisional application claims the benefit of priority under 35 USC § 119 to U.S. Patent Application No. 63/171,678, filed on Apr. 7, 2021, and U.S. Patent Application No. 63/278,809, filed on Nov. 12, 2021, the entireties of which are incorporated herein by reference.

BACKGROUND OF THE INVENTION

Field of the Invention

The invention relates primarily to a device, system and methods for monitoring the consumption and performance of solid or liquid additives into a fluid processing stream. More specifically, the present invention is a novel adaptable geometry such as a ring- or bar-shaped sensor to measure and monitor the consumption and performance from a solid chemistry feeder used in treating industrial process water systems such as cooling towers, boilers, and waste water.

Description of the Background

A myriad of industrial applications use systems or devices such as cooling towers, boilers, and the like as critical components thereof. Each of these systems comprises one or more fluid process streams, which, in addition to wastewater and other fluid lines may require sporadic or continuous treatment by chemicals to optimize efficiency of the industrial process, satisfy environmental regulations, or the like. Both solid and liquid chemistries are used in the art for these purposes. Accordingly, various types of solid and liquid chemical dispensing equipment have been developed to dispense solid or liquid chemical products, as the case may be, into the fluid process stream at issue.

Traditional chemical dispensing equipment, such as the AP TECH Ultra-m solid feeder, and prior art liquid chemical dispensing equipment, are not instrumented and rely completely on mechanical devices for operation. Therefore, these prior art units require periodic inspection to determine, in particular, the level of product in the feeder and whether or not replenishment is needed, as well as whether maintenance is needed. Of course, each such dispensing device has multiple parts which could individually or collectively malfunction in numerous ways or experience one of several operational anomalies. Delayed detection of problems could exacerbate even a minor maintenance issue, causing additional expense or downtime which could have been avoided if the problem was detected earlier.

The prior art has attempted to find solutions for consumption monitoring by developing new dispensing equipment with integrated sensor(s). For example, U.S. Patent Application Publication No. 2004/0230339 to Maser et al. discloses a method to measure product being used based on a load cell measurement for purposes of billing accuracy. However, integration of load cells into existing dispenser equipment generally requires a full equipment redesign for proper fit and to provide required protection from water and corrosive chemistry. Also, depending on the location at which the load cells are integrated, loads associated with portions of the equipment hardware and/or water may also be measured, requiring extraction of the data related exclusively to the chemical product, which introduces additional mathematical complexity and possibility for error in interpreting the data. Maser et al.'s solution is therefore not practicable for existing processes where cost or connectability considerations may rule out the replacement of existing dispenser equipment.

U.S. Pat. No. 5,417,233 to Thomas et al. discloses a method using an infrared emitter and receiver to send a beam across a solid dispenser. The line-of-sight emitter and receiver are positioned in the dispenser such that if a signal is detected an alarm/alert is triggered that a refill is required. In this case, the measurement is discrete and does not provide sufficient resolution to monitor consumption rate changes, i.e., it only can provide an average value for product used from time 0 until the low product alarm is triggered. Alternatively, multiple transmitters and receivers can be installed but the resolution is still limited by the physical size of the device and complexity in measuring multiple points. Furthermore, implementing this approach with bottle products, such as are common for solid chemistry dispenser systems, adds more complexity because of the additional opaque surfaces the light must transmit through.

Other types of sensors known in the art are similarly unsuitable for use in connection with solid or liquid chemistry dispensers which utilize solid discs or bottles of product, both of which are commonly used forms of product used for the above-noted purposes. Ultrasonic sensors, for example, are limited to measuring only the liquid or solid surface with consumption being determined from the change in height between the surface and sensor. This approach will not accurately indicate consumption of a bottle product.

Moreover, none of the prior art devices include means for integrating inputs from multiple sources to provide data regarding the number of fill cycles, reservoir level, overflow state, product weight and flow monitoring in a compatible manner so that this data can be integrated to provide useful feedback for an operator regarding the level of product in the feeder and whether replenishment is needed, as well as detection of performance anomalies to alert whether maintenance is needed.

SUMMARY OF THE INVENTION

What is needed, then, is a solution which can be adapted to the automatic measurement of disc or bottle products or other form factors used as chemical additives to industrial process lines. It would also be advantageous if such a device was capable of simple retrofitting onto existing dispenser units which utilized either of the above types of product form factors.

The invention therefore provides novel retrofit solutions to automatically monitor consumption of either solid or liquid chemistry used in water treatment programs for, i.e., cooling water and boiler applications. In some embodiments, the disclosed chemical product consumption monitoring devices use force sensors integrated into a sealed ring for retrofit installation on solid product chemical feeding systems used in water treatment. In other embodiments, the disclosed chemical product consumption monitoring devices use force sensors integrated into variously shaped and sized "sensor bars", which can easily be adapted to take on different exterior shapes and sizes to accommodate retrofit into various types of dispenser units, both known now or developed in the future. The sensor design is flexible and can be used with products having different form factors such as discs, bottles, or pellets. The sensor is used to monitor the product consumption rate based on weight or percentage for inventory management, by forecasting replenishment scheduling and, in preferred embodiments, providing a process for automatic ordering.

By combining the product consumption measurement with other sensor data from the dispenser, chemical delivery system, or process, the inventive system allows tracking dispenser performance and alarming if malfunctioning. Additionally, the inventive device and system can also incorporate data from additional sources to provide remote visibility for scheduling maintenance and troubleshooting.

In certain embodiments, the inventive system and method monitors product consumption continuously and develops and utilizes forecast models to determine the time period until replenishment is required. The inventive system can therefore also integrate an automated ordering inventory management model.

The foregoing objects, features and attendant benefits of this invention will, in part, be pointed out with particularity and will become more readily appreciated as the same become better understood by reference to the following detailed description of a preferred embodiment and certain modifications thereof when taken in conjunction with the accompanying drawings.

BRIEF DESCRIPTION OF THE DRAWINGS

In the drawings:

FIG. 2 is a composite ((A) and (B)) showing top and bottom perspective views of the exterior of the sensor ring 200 according to a preferred embodiment of the present invention.

FIG. 3 is a composite ((A) and (B)) showing top and bottom interior views of the sensor ring 200 shown in FIG. 2.

FIG. 14 is a composite (A) and (B) showing internal and external top views of the inventive ring sensor 200 according to another embodiment of the present invention.

FIG. 15 is a composite ((A) and (B)) showing top perspective and section views of a second embodiment of the sensor ring shown in FIG. 14.

DETAILED DESCRIPTION OF THE PREFERRED EMBODIMENTS

The present invention includes devices and corresponding system(s), and related method(s), for monitoring the consumption and performance from solid and/or liquid chemistry feeders used in treating industrial process water systems such as cooling towers, boilers, and waste water, as some examples. Product monitoring is based on measuring the product weight or change in weight using thin (in some preferred embodiments, 0.008 inch thick) film force sensors sealed in a liquid tight housing. The innovative design provides flexibility to retrofit the inventive sensors to various types of existing dispensing equipment. The application of the present invention is not limited to just the industrial processes listed above but can be applied to any feeding system where measuring the product consumption is of interest. Furthermore, the application can be applied to solid chemistry as well as other packaged products such as liquid or gel containers. For example, the invention can be applied to product monitoring on a variety of dispensers such as hand soap, laundry detergent, or ware wash. Alternatively, the inventive devices and methods can be integrated into a new dispenser design.

In some embodiments, the present invention incorporates a sensor ring in combination with hardware and software for receiving, processing, and outputting data based on same, which collectively make up the system according to the present disclosure.

Figure 1:
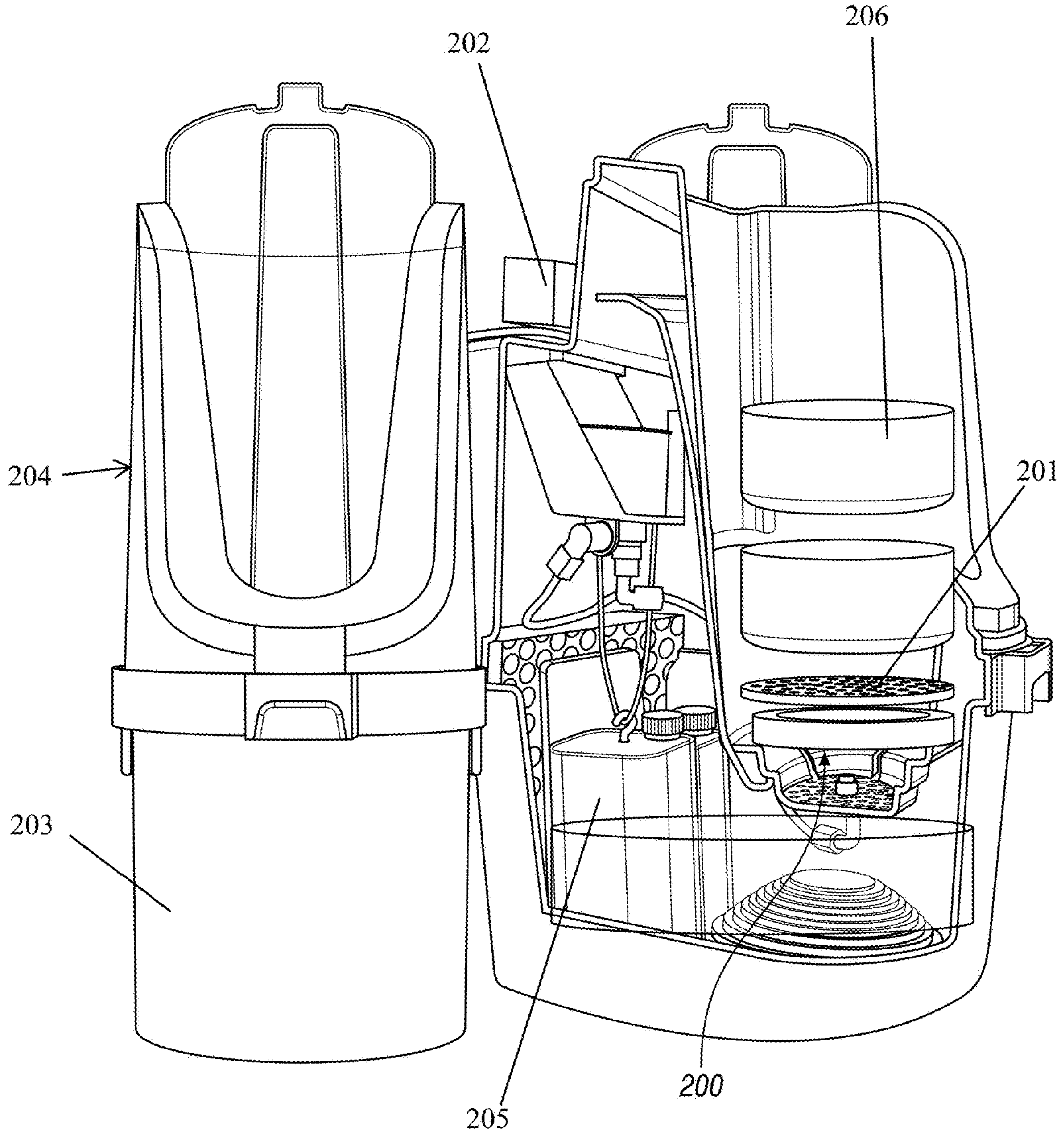
FIG. 1 shows both exterior and cut-away views of a solid chemistry dispenser with the inventive sensor ring 200 shown therein in exploded view.

FIG. 1 shows exterior and cutaway views of one style of existing solid chemistry dispenser into which one embodiment of the inventive device could be inserted with little to no retrofitting of the dispenser. The dispenser in FIG. 1 is representative of, e.g., the Ultra-m solid chemical feeders manufactured by AP Tech Group. The dispenser illustrated in FIG. 1 consists of a bottom section 203 and a top section 204. The bottom section 203 contains water and dissolved chemistry from the solid that gets periodically sprayed. Spraying is mechanically controlled using a float 205 that triggers a valve to open when the reservoir level is low. The top section 204 holds the solid product. This type of dispenser can hold product that comes in the following two form factors: discs and bottles (discs, represented here by reference character 206, are shown in FIG. 1 by way of example). Other dispensers are known in the art and may be used in connection with the instant invention, including ones that hold other forms of product, such as pellets.

Prior art dispensers of the type shown in FIG. 1 do not have any instrumentation, so an operator is required to visually inspect the device to determine if a fill is needed, and/or fills are added on a pre-prescribed basis based on the operator's historical knowledge of the frequency with which fills have been required in the past, e.g., once every 5-6 weeks.

FIG. 1 shows the preferred location of one embodiment of the invention, the sensor ring 200, which can be dropped in to dispensers of the type shown in FIG. 1 in the same way that, in this case, discs of solid chemistry are dropped in to the opening in the top section of the dispenser. In this example, the inventive sensor ring 200 has been placed underneath a removable support grate 201 which is used in the exemplary dispenser to support the solid discs while allowing water and liquified chemistry to pass through to the bottom of the dispenser upon being sprayed. In other embodiments, the order of items in the top section of the dispenser can be rearranged, provided that at least one of the inventive sensors 200 described herein is situated underneath the chemical product. Therefore, in some embodiments, the inventive sensor ring 200 may be dropped in and rest directly on top of the support grate 201, and/or multiple sensor rings 200 may be layered in between adjacent discs of solid chemistry. In other preferred embodiments, a bottle product can be used in conjunction with a dispenser having the same configuration shown in FIG. 1, with or without a support grate 201. Thus, in some instances, the bottle of product and/or the discs of solid chemistry can be supported directly by the inventive sensor ring 200.

Figure 4:
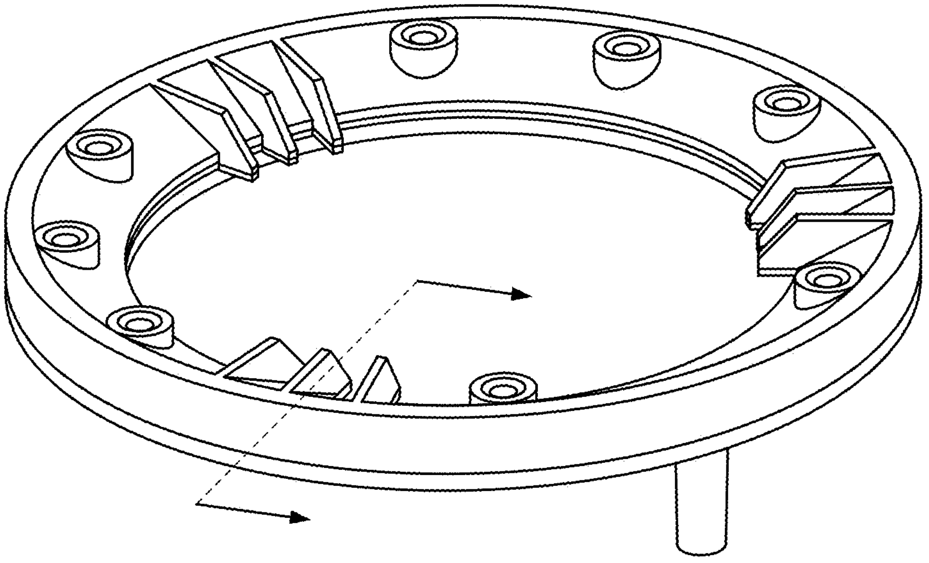
FIG. 4 is a composite ((A) and (B)) showing top perspective and section views of the sensor ring 200 shown in FIG. 2.
Figure 4:
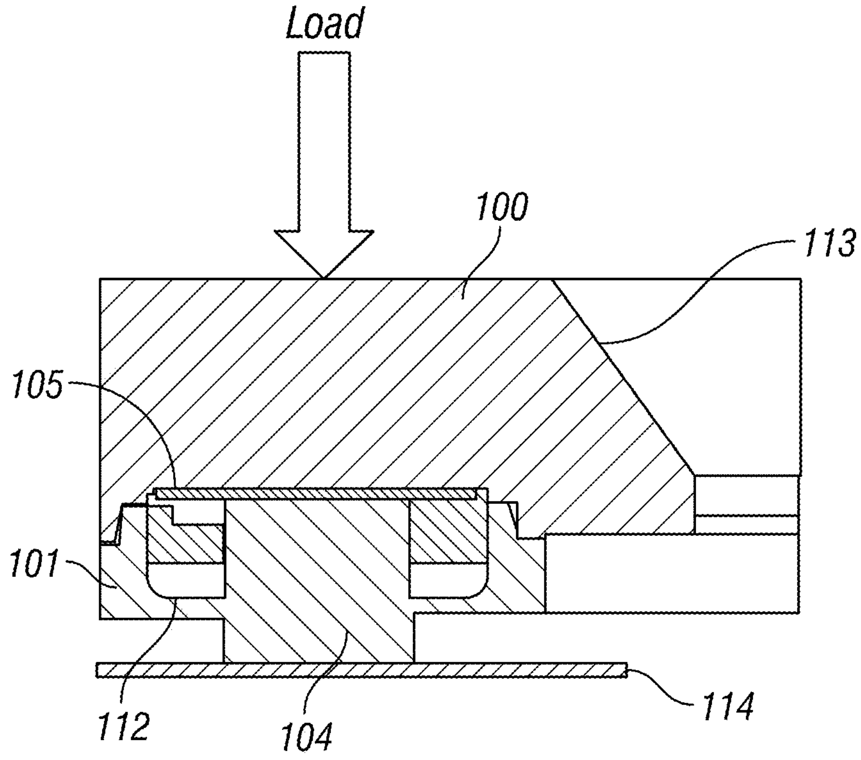

FIG. 2 shows two views of the inventive sensor ring 200, according to one embodiment of the instant invention, in isolation. In some embodiments, the sensor ring 200 is a ring-shaped device with a flat bottom 101, perpendicular sidewall and concave upper face 100 which tapers down to a central opening. In the instant embodiment, the preferred outside diameter of the ring 200 is 6 inches and the preferred inside diameter of the ring 200 is 4.325 inches. However, it will be understood by a person having ordinary skill in the art that the size and shape of the ring 20 can be adjusted to fit a specific dispenser design or otherwise based on design preference. The top side 100 of the sensor ring 200 corresponds to the side that faces the chemical product, and is opposite bottom side 101. The top 100 and bottom 101 sides are shown in FIGS. 2-4 with holes sized to fit mounting screws 103 to join top 100 and bottom 101 sections with the sensor components (as will be described) therebetween. However, other attachment means between top 100 and bottom 101 of the ring 200 could include means known in the art, including but not limited to gluing or ultrasonic welding, in which case mounting screws 103 and their respective mounting holes could be eliminated or replaced by other mechanisms to facilitate that connection, as will be understood in the art.

Material of construction for the sections 100 and 101 can be any plastic polymer material that provides both water resistance and chemical compatibility with the solid product as well as the dissolved solid product, including but not limited to HDPE (high density poly ethylene), PVC, CPVC, PTFE, Kynar, PEEK, and Nylon.

FIG. 3 shows the interior components of the inventive ring 200 according to one embodiment of the invention. As shown, in this embodiment, ring 200 incorporates three sensors 105. FIG. 3 illustrates that the three sensors 105 are equally spaced around the perimeter of ring 200, each 120 degrees apart. However alternative numbers of sensors 105, and a different radial distribution of the sensors 105 can be chosen based on the application and overall size and shape of the ring device 200. Wiring 107 (if used) for each sensor 105 runs along the internal area of the ring with all connections exiting the interior of the ring 200 through opening 106. In the illustrated embodiment, a standard 6 conductor cable 24 AWG wire is used with each pair connected sensor 105. Opening 106 is connected to a passage 113 that feeds the wiring 107 out for further connection, as will be described.

Figure 5:
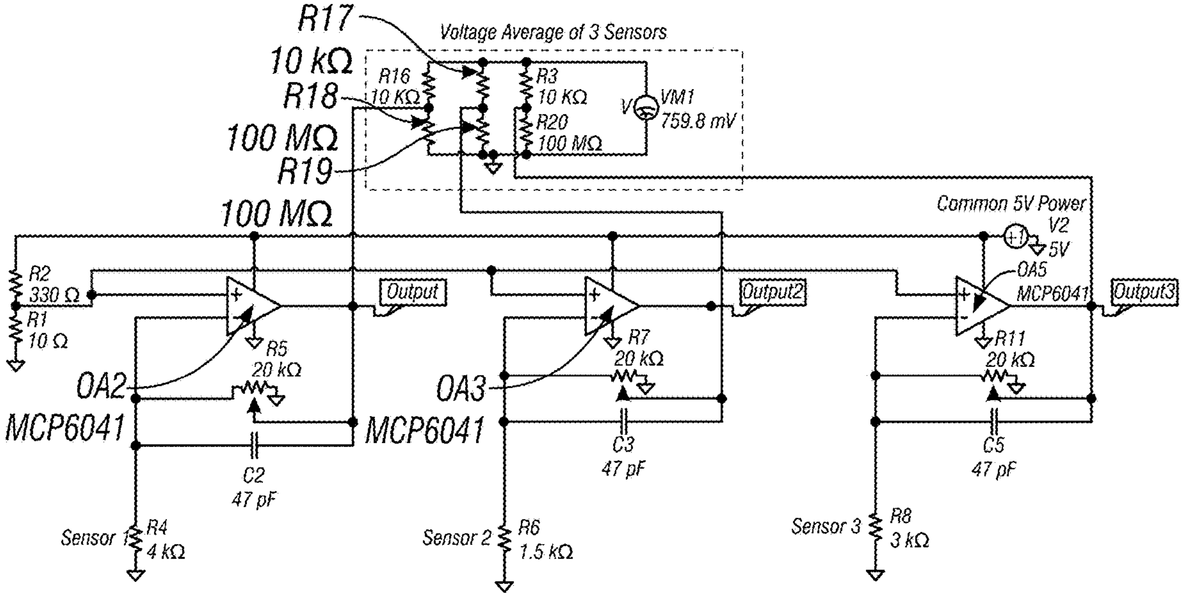
FIG. 5 is a schematic circuitry diagram of the sensor ring 200 comprising three sensors according to one embodiment of the present invention.

FIG. 5 is a schematic diagram of the circuit that could be used in an embodiment where three sensors are utilized. FIG. 5 also shows component specifications, that uses a non-inverting op-amp circuit modified to monitor the three sensors 105 simultaneously, convert the sensor signal to voltage, and output the average voltage from the three sensors 105.

In some embodiments, sensors 105 are thin film sensors such as model #ESS301, manufactured by Tekscan INC. 307 West First Street, South Boston, Mass. 02127. Other types of sensors known in the art or hereafter developed could alternatively be used. For example, one or more miniature load cells, such as the TE Connectivity FX29. It will be understood that the dimensions and/or shape of top and bottom sections 100 and 101 of the ring sensor 200 can be modified to accommodate one or more sensors of the type suitable for this purpose, all without departing from the spirit and scope of the present invention. An exemplary alternative embodiment, whereby the dimensions and shape of top and bottom sections 100 and 101 of the ring sensor 200 have been modified to house a sensor of the type sold by the name TE Connectivity FX29, is shown in FIGS. 14 and 15. In this alternative embodiment, sensor 300 may be mounted in the bottom section 101 of the sensor ring 200. To accommodate sensor 300, as shown in FIG. 14, the top section 100 and bottom section 101 may be slightly modified with a bump-out 301 to encase sensor 300 between the bottom 101 and top 100 sections of the ring. A cross sectional view of the modified area 301 is shown in FIG. 15. The elements required for mounting sensor 300 follows the same principles as the thin film force sensor, and the remaining elements of the sensor may be as described herein.

On the bottom 101 of the ring 200, force concentrators 104 may be positioned directly under the locations where the sensors 105 will reside on the interior of ring 200.

On the top 100 of ring 200, ribs 102 may be positioned over the locations where the sensors 105 will reside on the interior of ring 200. Three sets of three ribs 102 are shown in FIG. 2, but it will be understood that various other configurations can be used based on application. The rib supports 102 are advantageously used to support bottle products used in the dispenser. Also on the top 100 of ring 200, sensor mounting guides 109 and 108 may be provided to assist with positioning the sensor during assembly, as will be described.

In some embodiments of the disclosed invention, sensors 105 are thin film sensors (e.g., model #ESS301, produced by Tekscan INC. 307 West First Street, South Boston, MA 02127). Sensors of this type are very thin (e.g. 0.008 inches thick) and require only an external force applied to the sensing surface indicated by the circular area on 105. The thinness of the sensor allows integration into the sensor support structure 100 and 101, which is designed to maintain all dimensional requirements, with minimal interference or design changes, for a dispenser of the type shown in FIG. 1. This represents an improvement over prior art dispensers that utilize load cells, even miniature load cells, which are typically 20-75 times thicker, thus requiring significant design changes to integrate these sensors into an existing dispenser geometry. Another advantage of the presently-described embodiment of this invention is that sensors 105 are (in preferred embodiments) housed completely in a structure that can be sealed (preferably water-tight), to prevent infiltration of liquids, corrosive elements, and other potentially damaging contaminants.

FIG. 4(B) shows a section view of the assembled ring 200, where the section is taken in the location indicated in FIG. 4(A), according to some embodiments of the invention. Reference character 114 represents the bottom surface of the dispenser. One sensor 105 is shown in this cutaway view, sandwiched between top 100 and bottom 101 portions of the ring 200. Directly below sensor 105 is the force concentrator 104, which is made from solid material and is in contact with the dispenser bottom surface 114 and sensor 105. In the illustrated embodiment, the material around the force concentrator 104 is thinner compared to the main body of 101. This thinned section 112 allows enough flexion for sensor 105 to compress. The flexing of the ring material around the sensor 105 transfers force acting downward on the top of the ring 200 to the sensors 105. The higher the load the greater the flexion and compression into sensor 105.

Figure 10:
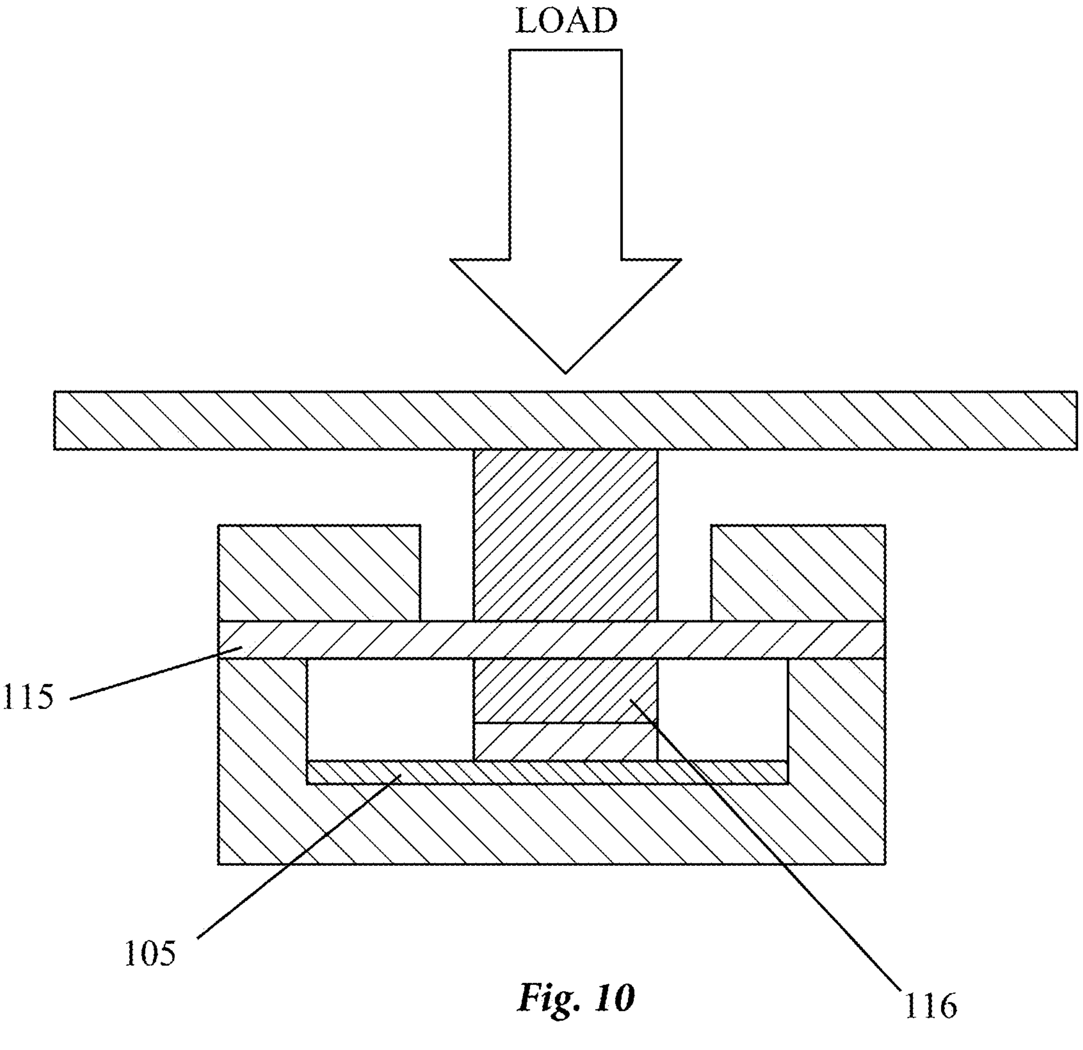
FIG. 10 is a cutaway view showing a section view of the sensor ring in an alternative embodiment of the present invention.

In other embodiments, alternative methods can be used to provide a means to transfer the load to the sensors 105. Requirements for this approach include a method to form a seal around the sensor that provides enough flexion for the sensor to respond. For example, with reference to FIG. 10, a gasket sheet 115 can be used to form a seal between the top and bottom sections with an open area in contact with the sensor. A force concentrator 116 in this area will transfer the force through the gasket sheet 115 to the force sensor. Another potential approach is to encase the sensor in a molded material, e.g., urethane. Requirements for this approach are that the molded material have elasticity to transfer the load to the sensor, be chemically compatible, and be manufactured at conditions (e.g., temperature) which are not damaging to the sensors 105.

To assemble the sensor ring 200 in a dispenser of the type shown in FIG. 1, a water and chemical resistance glue or high viscosity gasket forming material can be applied as a bead to the outer and inner diameter edges, 110 and 111 respectively, of the sensor ring 200. Assembly is then made by mating the two sections 100 and 101 of sensor ring 200 and clamping them together using screws 103 or one or more of the alternative connection means described above.

The sensor electronics 202, as will be described, may be located outside of the dispenser and connected to the sensor ring by a cable that feeds into the interior of the sensor ring via passage 113. In this embodiment, installation of the sensor ring 200 also requires drilling two small holes for the cable; one for the cable to feed through the dispenser ledge that supports the solid products and the other the electronics connection.

Figure 16:
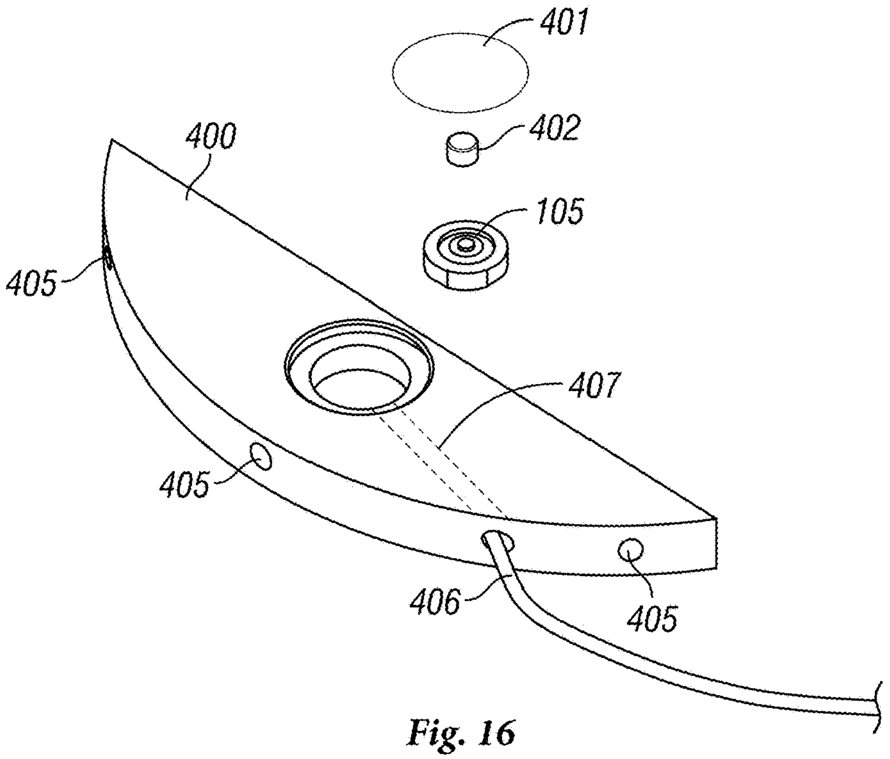
FIG. 16 illustrates a sensor bar having a semi-circular exterior shape, which is capable of mounting externally to the chemistry-holding portion of a dispenser, according to another embodiment of the present invention.
Figure 17:
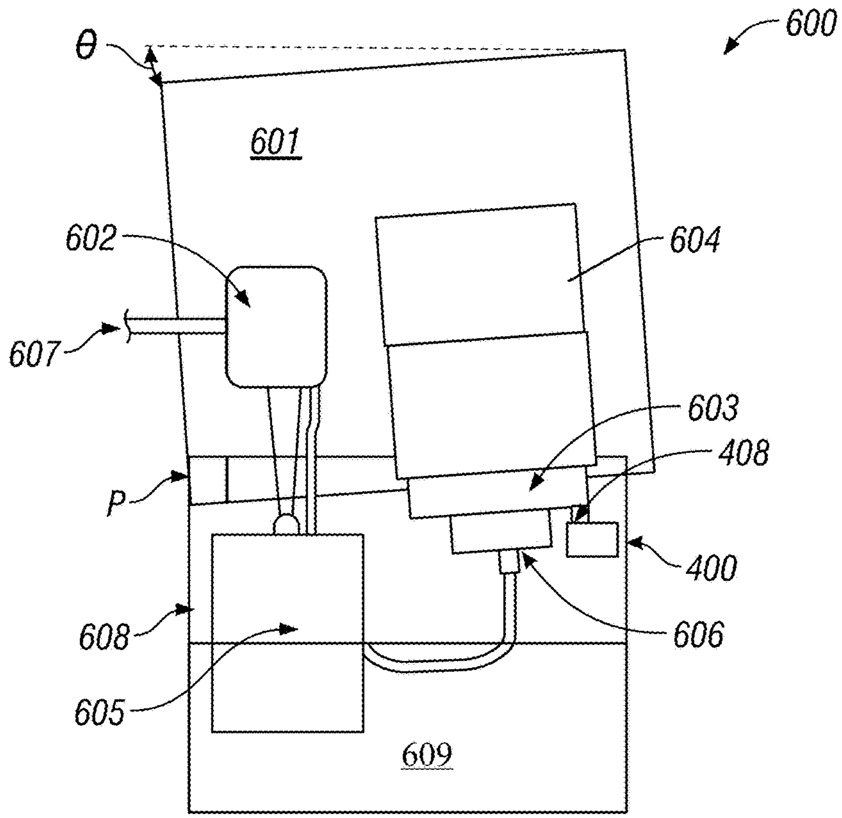
FIG. 17 illustrates one possible mounting location for a bar sensor according to one embodiment of the present invention.

Another embodiment of the inventive sensor device is shown with reference to FIGS. 16-18 and 21. The sensor embodiment shown in FIGS. 16-18 and 21 is advantageously adapted to accommodate solid chemistry discs, bottled liquid chemistries, liquid pail products and self-contained pre-filled chemical cartridges often used in water disinfection operations. In this embodiment, the inventive sensor device takes the form of a sensor bar 400 having various possible configurations. FIG. 16 shows a sensor bar having a semi-circular exterior shape, which is capable of mounting externally to the chemistry-holding portion of a dispenser. FIG. 17 shows one possible mounting location for the sensor depicted in this embodiment. As described previously, a standard solid/liquid chemistry dispenser 600 includes a top section 601 comprising a control valve 602, product support 603 (designed to support either bottled liquid or solid disc chemistry—a solid disc is illustrated in FIG. 17), product 604 (disc or bottle), float 605, and spray nozzle 606, as well as a supply water inlet 607. Top section 601 assembly is removable and clamps onto a bottom section 608, in which the water and dissolved solids 609 reside before being released into the system. As shown in FIG. 17, in one embodiment, sensor bar 400 is mounted at the front of bottom section 608, which has a curved exterior and interior surface. As will be understood, the shape and curvature of the curved side of sensor bar 400 can be produced to match the shape and curvature of the interior surface of bottom section 608 of the dispenser 600 for a custom fit.

Figure 18:
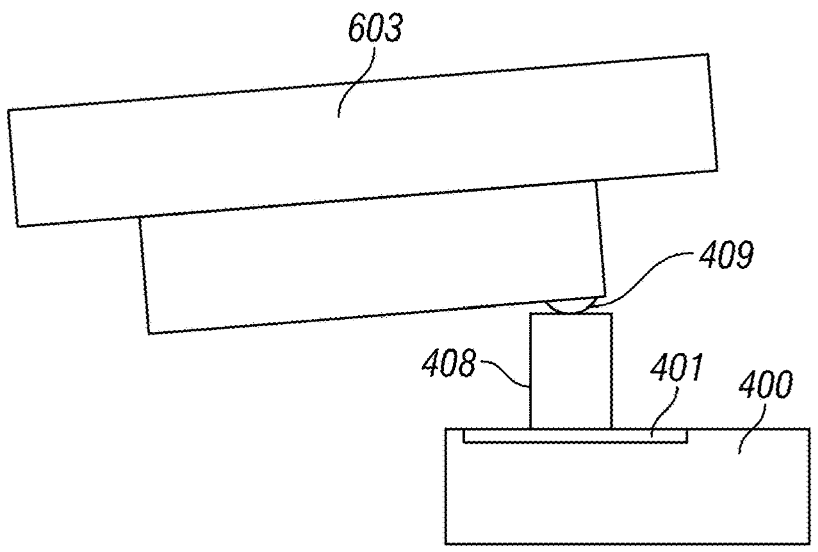
FIG. 18 is a detailed view of the external force concentrator 408 according to one embodiment of the present invention.

In the illustrated embodiment, an external force concentrator 408 is located at the center of cover plate 401 (as will be described) which contacts the top section product support structure 603. Force concentrator 408 better transfers the load of the top section 601 of the dispenser through cover plate 401 and internal force concentrator 402 (as will be described) to sensor 403. A detailed view of the external force concentrator 408 is shown in FIG. 18. As can be seen, in some embodiments, force concentrator 408 can be a cylindrical post extending up from the top of sensor bar 400 at the location of cover plate 401. In preferred embodiments, the top of force concentrator 408 includes a rivet 409 (such as McMaster Part Number 90218A310, or the like). As shown in FIGS. 17 and 18, installation of the inventive sensor bar 400 at the front of the dispenser could cause the top section 601 to rise slightly on one side, around a pivot point P at the back of the dispenser on which the top portion 601 remains supported on bottom section 608. Thus, rivet 409 moves the support structure load toward the center of the force concentrator 408, thereby improving linearity of the measurement which is taken by the inventive device as described herein.

Figure 19:
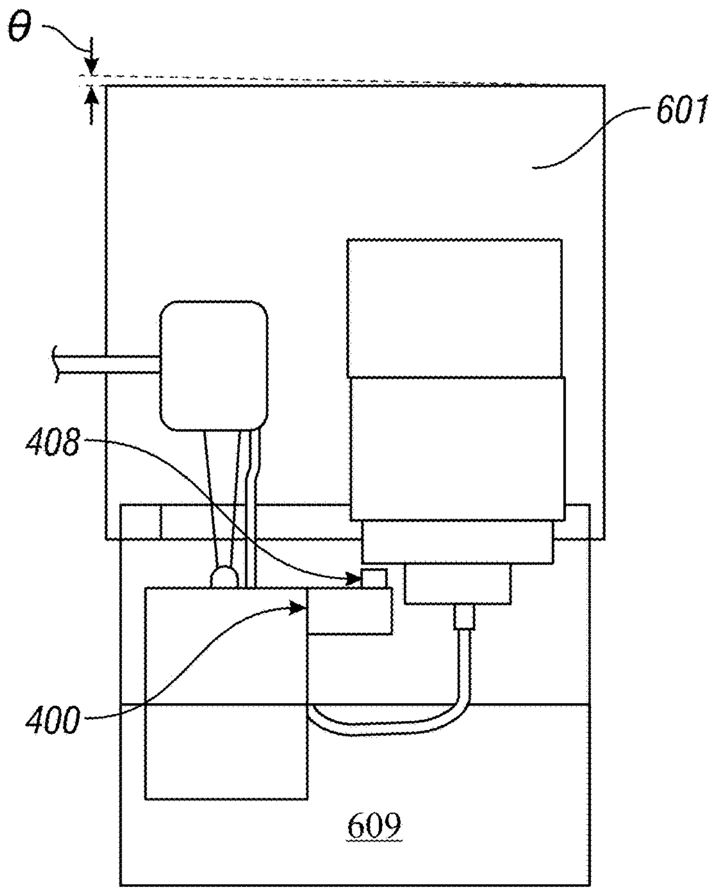
FIG. 19 illustrates another possible mounting location for a bar sensor according to one embodiment of the present invention.

FIG. 19 shows a different location of the inventive sensor bar (labeled with reference character 500 in this embodiment) according to another embodiment of the present invention. As shown in FIG. 19, the inventive sensor bar can also be mounted in the center of dispenser 600. An external force concentrator 408 can be utilized in a position abutting any portion of the bottom of the product support structure 603. As will be described with reference to FIG. 20, variations to the exterior shape of sensor bar 500 can be made to accommodate existing or contemplated structures in the interior of the dispenser 600, to enable placement of the inventive sensor in multiple locations underneath the liquid or solid chemistry support 603. For example, the embodiment shown in FIG. 20 includes a cut out 505 to provide clearance for the float or other interior components.

Figure 21:
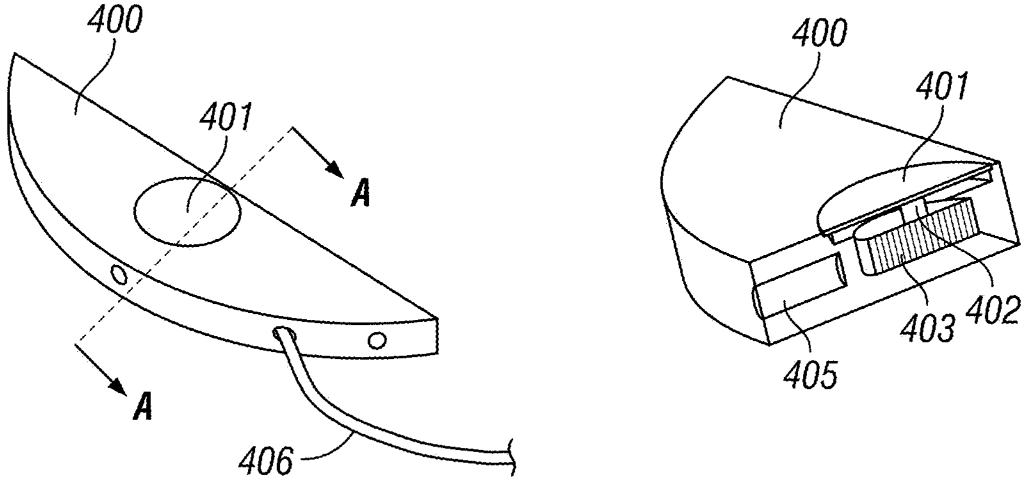
FIG. 21 shows a cutaway view of the sensor bar 400 along line A-A, according to one embodiment of the present invention.

Referring now to FIG. 16 and to FIG. 21, which shows a cutaway view of the sensor bar 400, according to one embodiment of the present invention, along line A-A, it can be seen that one embodiment of the present invention is a solid bar 400 machined to hold a sensor 105 (for example, a sensor branded under the name and part number TE Connectivity FX29) which is sealed inside sensor bar 400 with a thin cover plate 401. In some embodiments, an interior force concentrator 402 is also mounted inside sensor bar 400 under cover plate 401 and centered on sensor 105. The force concentrator 402 is preferably positioned to contact the center of sensor 105 and cover plate 401. The preferred material of the force concentrator 402 is metal, to avoid long term deformation due to continuous load; however other materials known in the art to be capable of non-deformation under continuous load could also be used. In some embodiments, cover plate 401 is a thin material ($1/16$-$1/32$ inches thick) to allow flexion and transfer of the force of a load applied on cover plate 401 the sensor 105 through the force concentrator. Cover plate 401 may be sealed to sensor bar 400 using any known method for joining plastic materials, such as solvent welding, epoxy, ultrasonic welding, and/or plastic welding.

In the illustrated embodiment, the exterior surface of sensor bar 400 is curved to mount into a dispenser of the type manufactured by the company AP TECH. In a preferred embodiment, the curvature of sensor bar 400 matches the front portion of the bottom section of the dispenser. Sensor bar 400 further comprises one or more tapped holes 405 for use in mounting the sensor bar 400 to the interior of the dispenser. In some embodiments, a through hole 407 allows a sensor cable 406, which is operatively connected to sensor 105, to exit sensor bar 400 to send data to sensor electronics located remotely from the sensor bar 400. In other embodiments, described herein, sensor electronics may be housed within sensor bar 400, and/or connected to sensor 105 by wireless means, such that through hole 407 and/or sensor cable 406 can be altered or eliminated as will be understood in the art. Where a sensor cable 406 is used, it may be sealed into the sensor bar 400 using potting epoxy or other means known in the art.

Figure 20:
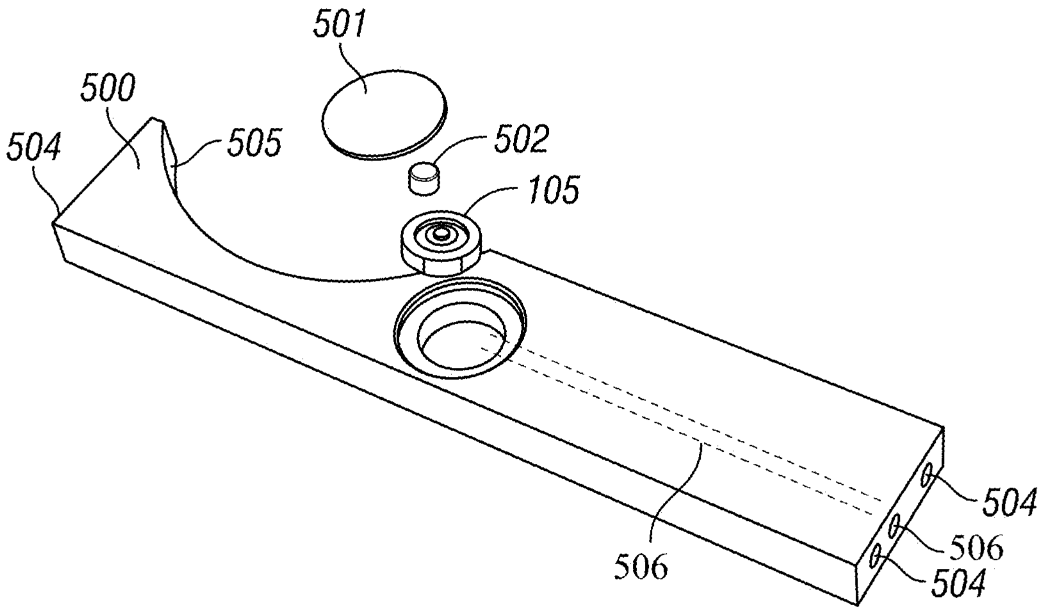
FIG. 20 illustrates the inventive bar sensor 500 according to one embodiment of the present invention.

Referring now to FIG. 20, another embodiment of the inventive sensor 500 is shown. As noted previously, the inventive bar sensor(s) disclosed herein are not limited to mounting at the front of the dispenser, but can be implemented at any location under the top section 601 that does not interfere with the dispenser components and can support the weight of the top section 601. FIG. 20 shows a sensor bar 500 which is designed for a center mount within the dispenser. In this embodiment, bar 500 has cover plate 501, force concentrator 502, and sensor 105, each of these components being the same or similar to those described above with respect to other embodiments of the present invention. A cut out 505 is provided in the present embodiment to provide clearance for the float. Through hole 506 provides egress for a sensor cable, if used. The sensor bar 500 may be mounted to the bottom of the dispenser via using one or more tapped holes 504.

Material of construction for the external housing for sensor bars 400, 500 can be any plastic polymer material that provides both water resistance and chemical compatibility with the solid product as well as the dissolved solid product, including but not limited to HDPE (high density poly ethylene), PTFE, Kynar, PEEK, PVC, CPVC, and Nylon.

Figure 22:
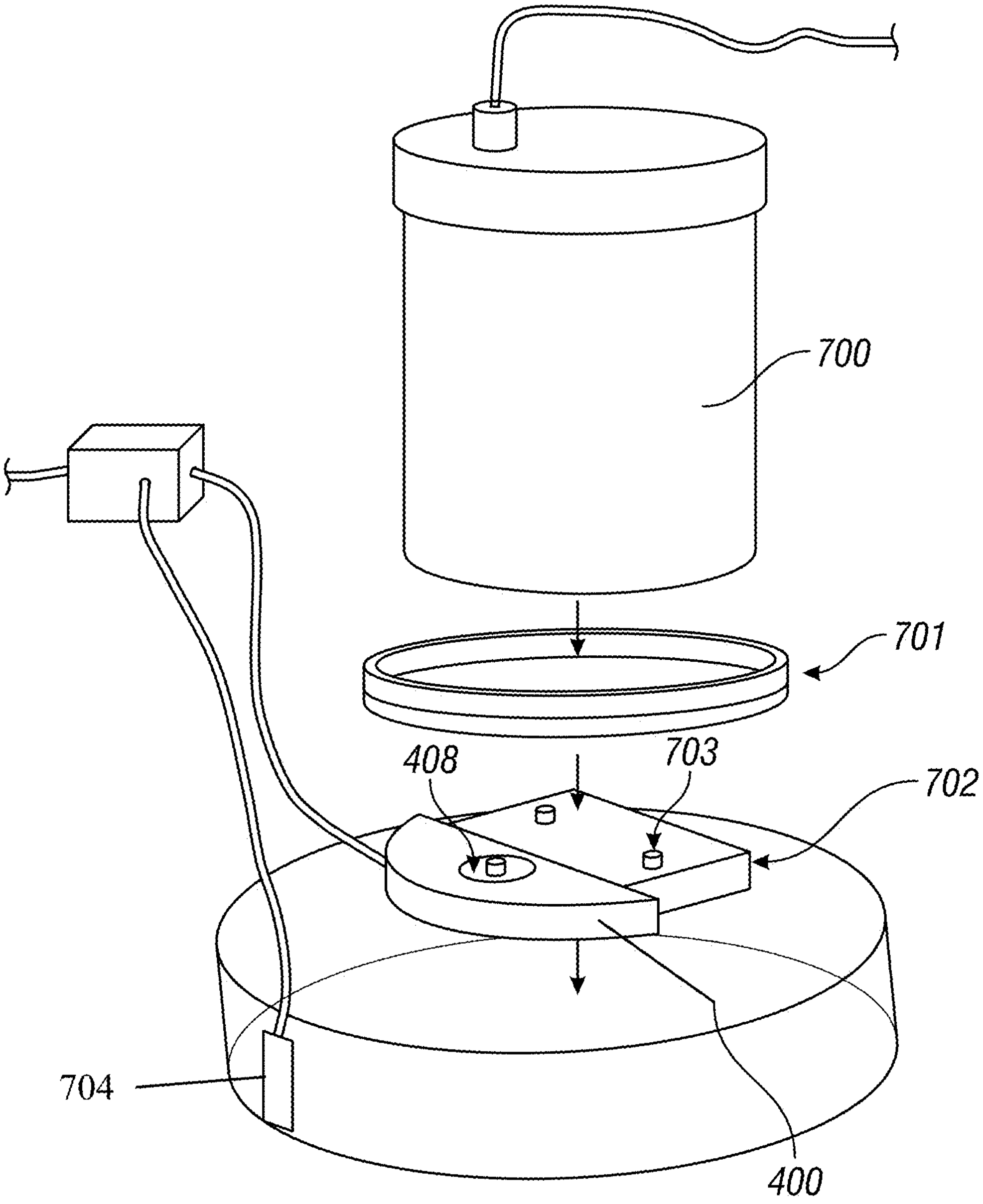
FIG. 22 illustrates application of the inventive sensor bar to a liquid pail container, according to one embodiment of the present invention.

In some embodiments of the present invention, the inventive sensor bars 400, 500 can be adapted to other chemistry product formats, such as pails or other liquid packaged products of roughly 5-15 gallons or more. With reference to FIG. 22, a liquid product container 700 rests on a container fixture 701, which in turn is installed above a support plate 702 comprising one or more stabilizing contact points 703 to stabilize liquid product container 700 resting thereon. As shown, sensor bar 400 can be installed adjacent to support plate 702. Although a sensor bar 400 having a semi-circular exterior housing shape is shown in FIG. 22, it will be understood that any shape of exterior housing that positions force concentrator 408 underneath the chemistry vessel to be measured and fits inside the containment vessel could be utilized. The present invention can be used in connection with a liquid product container having an exterior geometry which is round, as shown in FIG. 22, square, rectangular, or a number of other shapes.

With the liquid container supported by the fixture 701, the weight of the liquid container transfers to the force concentrator 408 and then on to the sensor 105. The output signal from the sensor 105 may then be converted to weight or volume by using the known product density as a factor. The inventive sensor 400 can be housed in a containment vessel used to capture liquid leaking from the container 700 or associated tubing. In some embodiments, a leak sensor 704 may be used to detect if a leak occurs. For example, one form of leak sensor may be a capacitance sensor, which operates by detecting the presence of liquid near the sensing element that detects a change in the field due to the change in the dielectric constant. Other forms of leak sensors are known in the art and may be used in connection with the present invention. For leak detection, the leak sensor can be placed on the side or bottom of the containment vessel. For example, a differential style capacitance sensor may be attached to the bottom section of the dispenser is used to monitor the liquid level. Because the sensor is a strip in this embodiment, the liquid level measurement can be made over the full range of the dispenser. As will be understood, one or more leak sensors of various types known in the art or hereafter developed may be used in another location depending on the specific requirements of the given sensor. In this embodiment, force concentrator 408 and stabilizing contact points 703 collectively provide stable footing on which the liquid product container 700 can securely rest. Also shown in FIG. 22 is a wired connection between the sensor bar 400 and an electronics module, which may also be operatively connected to the leak sensor.

Figure 23:
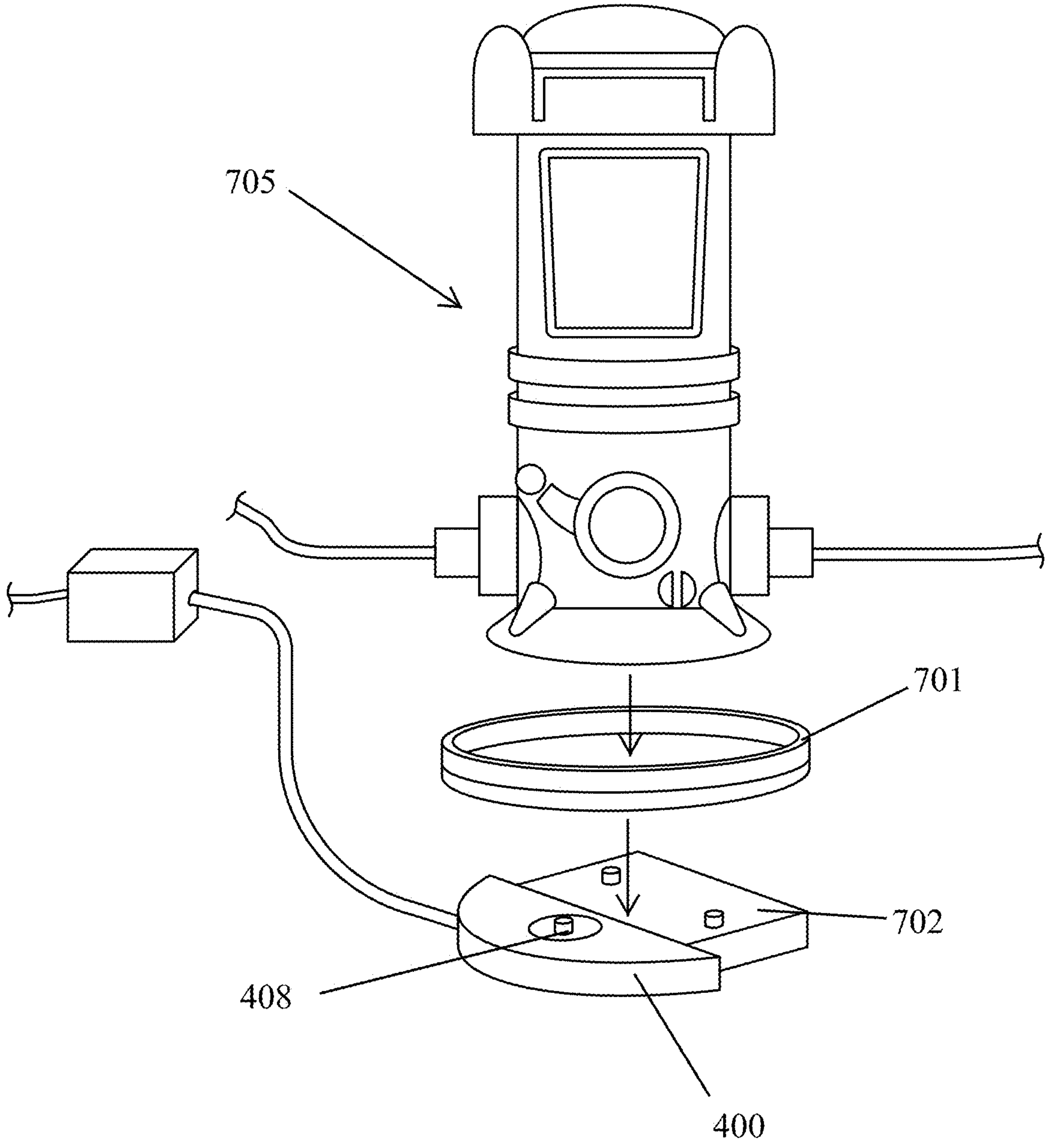
FIG. 23 illustrates application of the inventive sensor bar to a commercial dispenser consisting of a flow through chamber that uses a cartridge of solid chemistry, according to one embodiment of the present invention.

In addition to small liquid packaged products, the inventive sensor bar 400, 500 according to various embodiments of the present invention can be extended to sealed dissolving products, e.g., bromine chemistry, used as a water treatment disinfectant. In one exemplary embodiment, with reference to FIG. 23, the inventive sensor 400, 500 is adapted to use with a commercial dispenser produced by OXIKING 705, which consists of a flow through chamber that uses a cartridge of solid chemistry. The OXIKING dispenser uses a pre-filled bromine cartridge to reduce hazards in handling this material. The solid material dissolves through the action of water passing through the holding device. Consumption is based on gallons of water treated or by visual inspection of the cartridge by opening the unit to check the level. A continues monitoring of the OXIKING can be achieved using the inventive sensor bar 400, 500 with a container fixture as shown in FIG. 23. In the present embodiment, it can be seen that the illustrated dispenser uses flexible lines on the inlet and outlet of the dispenser. Flexible lines may be used to allow the unit to float, thereby measuring the weight change as the solid chemistry is consumed. As the solid dissolves in the water passing through the holding device, it is replaced with liquid. In this case the inventive sensor 400, 500 will measure both the undissolved solid and liquid in the OXIKING-type dispenser. Assuming the density of the undissolved solid is greater than that of the liquid (such as liquid water, with a density of 1.0 $g/cm^3$), the decrease in total weight will allow the inventive system, or a user, to calculate the proportion of undissolved solid remaining in the dispenser. A containment vessel can be used, similar to the pail application, as a means to capture and detect leaks. In this embodiment, leak detection is critical because process water flows through the system, making early leak detection important.

Figure 25:
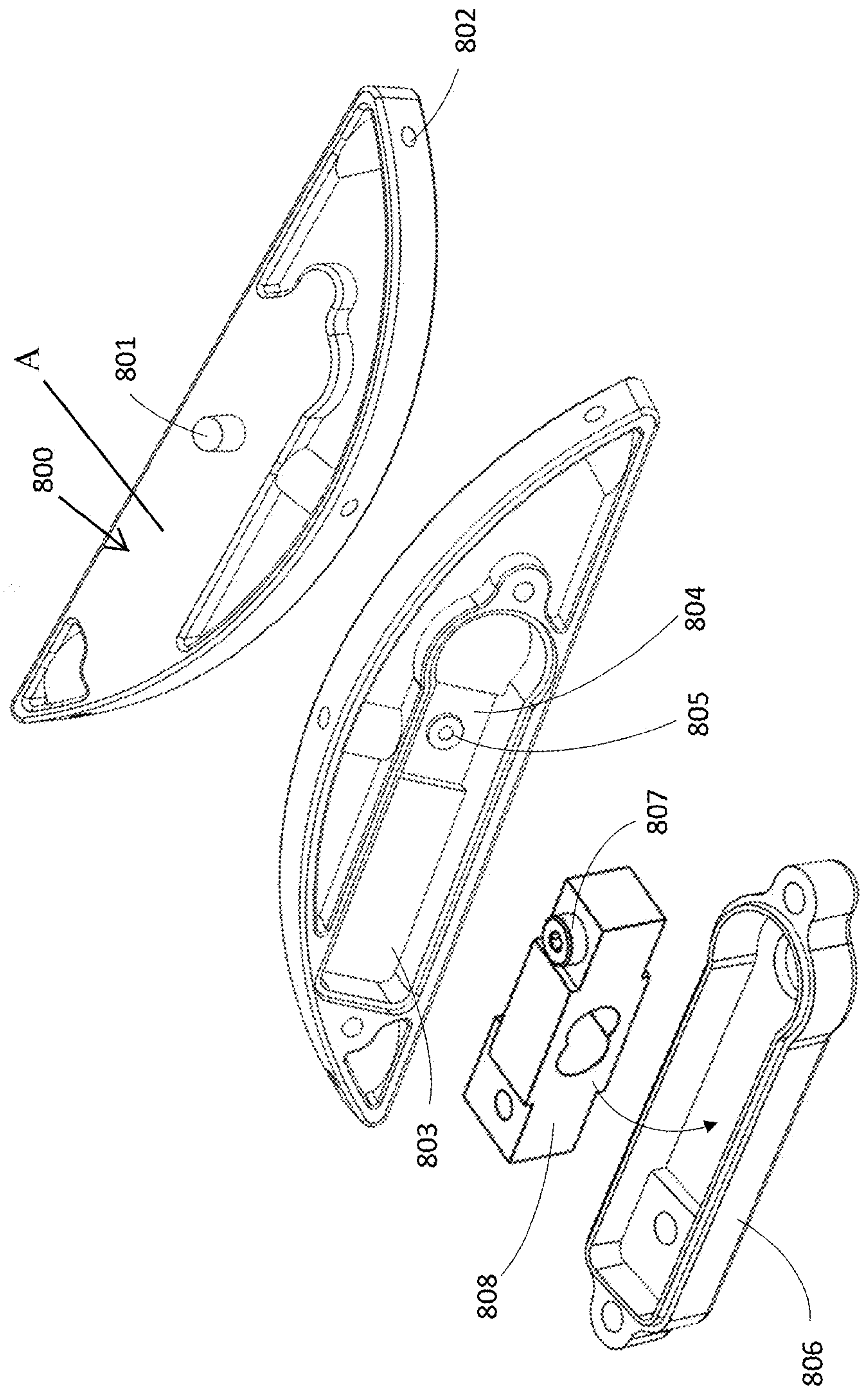
FIG. 25 is an exploded view of the inventive sensor bar 800 according to another embodiment of the disclosed invention.
Figure 26:
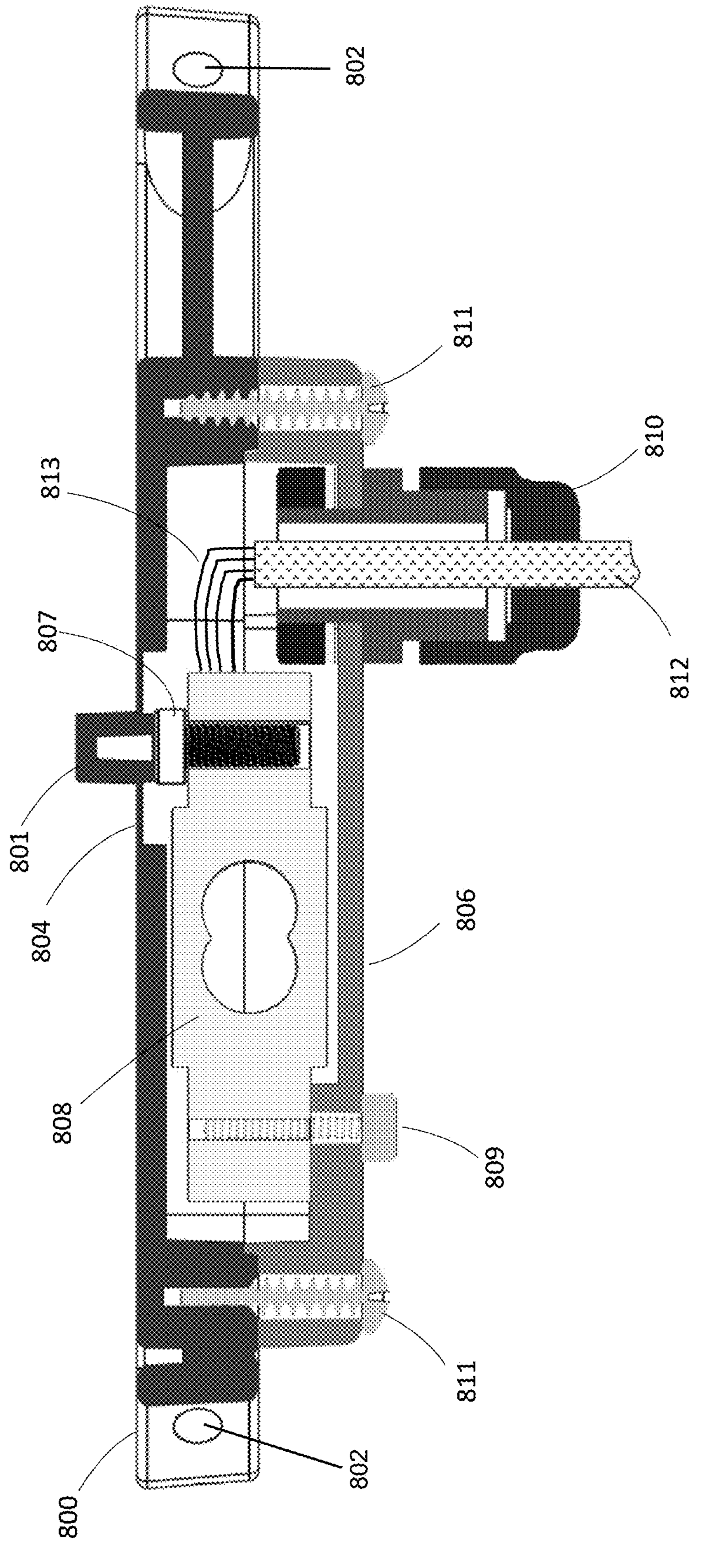
FIG. 26 is an assembled cross-sectional view of the inventive sensor bar 800 of FIG. 25.

Yet another embodiment of the inventive sensor bar 800 is shown in FIGS. 25 and 26. As shown therein, the instant embodiment houses a straight bar load type cell of a type known in the art. With reference to FIG. 25, the present embodiment is a sensor 800 of the type which mounts to the bottom section of a liquid dispenser as described with reference to other embodiments of the present invention. Mounting is made by securing the bar to the dispenser using self-tapping plastic screws with pilot hole 802. A force concentrator 801, as described herein, may be placed in contact with the top section of a dispenser in which sensor 800 is installed. In embodiments, the bottom side of sensor 800 may include an expanded cavity 803 with a thinned area 804 including a secondary, internal force concentrator 805. The wall thickness in the area indicated by reference character A is thinned to allow flexion for the load to transfer to the internal force concentrator 805 that is in contact with element 807 on bar sensor 808. An example of bar sensor 808 that can be used in the present embodiment is from HT SENSOR TECHNOLOGY CO., LTD. Model TAL220B. These devices are available in range of capacities (1, 2, 3, 4, 10, 20, 50 kg) providing flexibility based on application need. As shown, the bar load cell 808 may be supported by a bottom housing 806 that mounts on to the bottom of the top housing including force concentrator 801.

An assembled cross-section view of sensor 800 and bottom housing 806 according to the present embodiment of the invention is shown in FIG. 26. As shown therein, load cell 808 may be mounted in housing bottom housing 806 and securely fixed by screw 809. The load cell is supported on a step in housing 806 forming a cantilever. A downward force applied to external concentrator 801 makes contact with element 807, thus applying a strain on load cell 808 that outputs a voltage signal proportional to the load. To collect the power and signal from load cell 808, a 4 conductor cable 812 pass through a water tight cable gland 810. Screws 811 join the bottom housing 806 to top housing 800.

Figure 27:
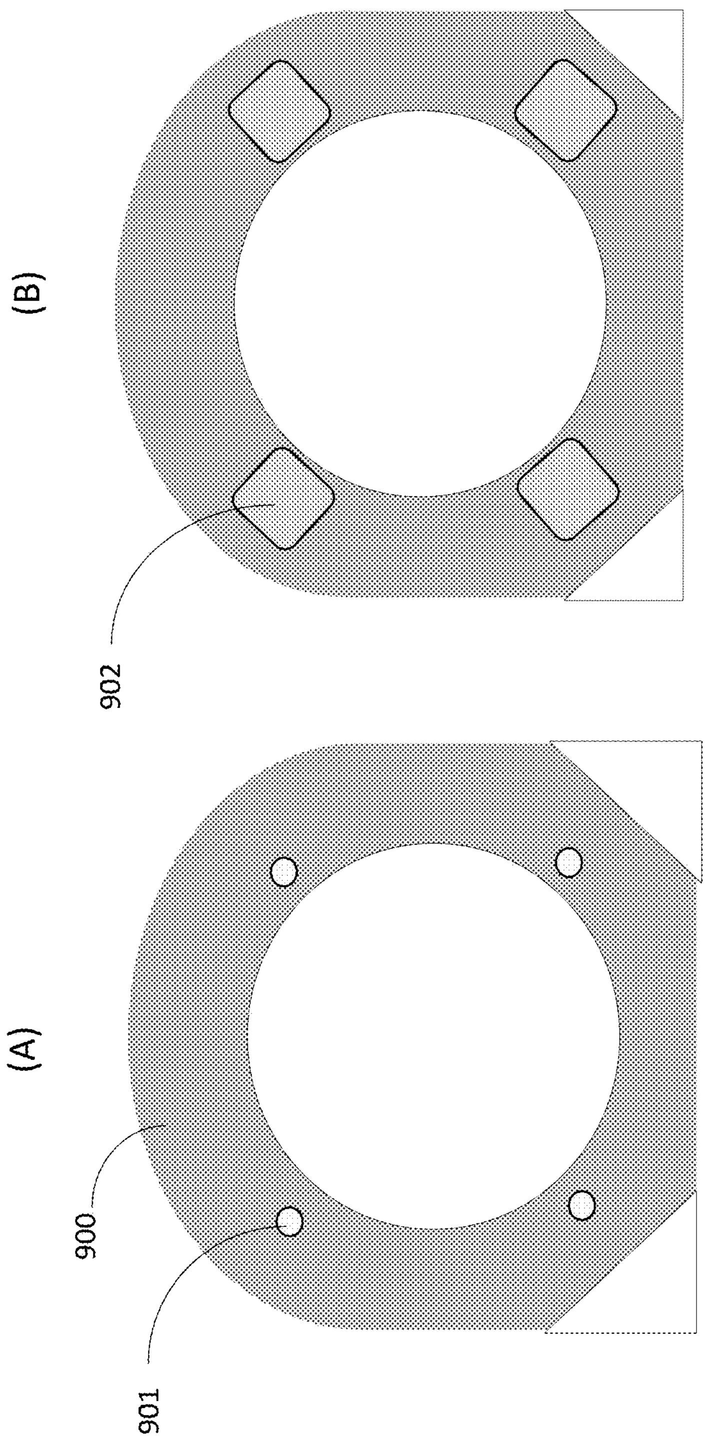
FIG. 27 is a composite ((A) and (B)) showing top and bottom views, respectively, of the inventive sensor ring 900 according to another embodiment of the disclosed invention.
Figure 28:
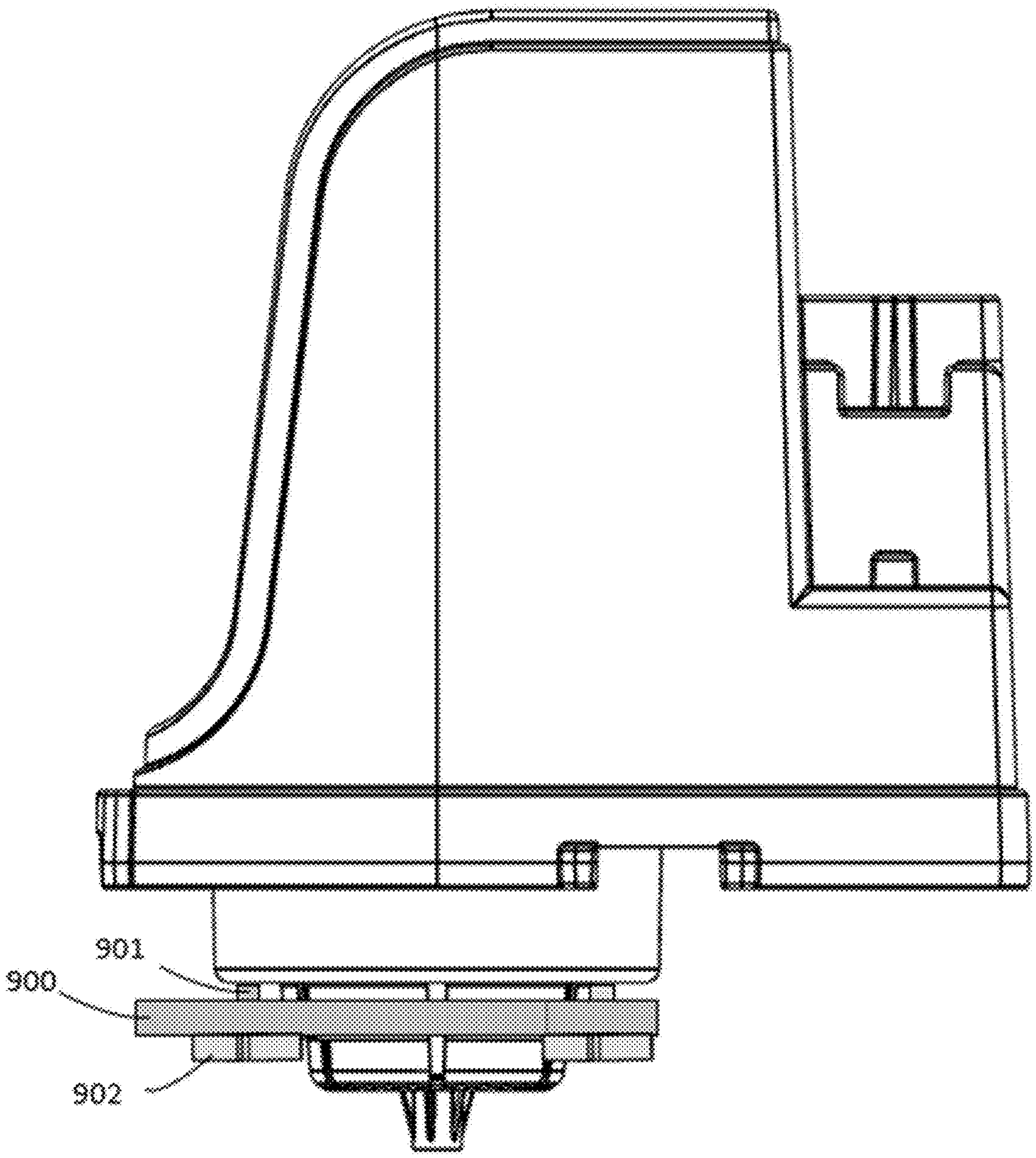
FIG. 28 is a side view of a dispenser unit incorporating the embodiment of the inventive sensor ring shown in FIG. 27.
Figure 29:
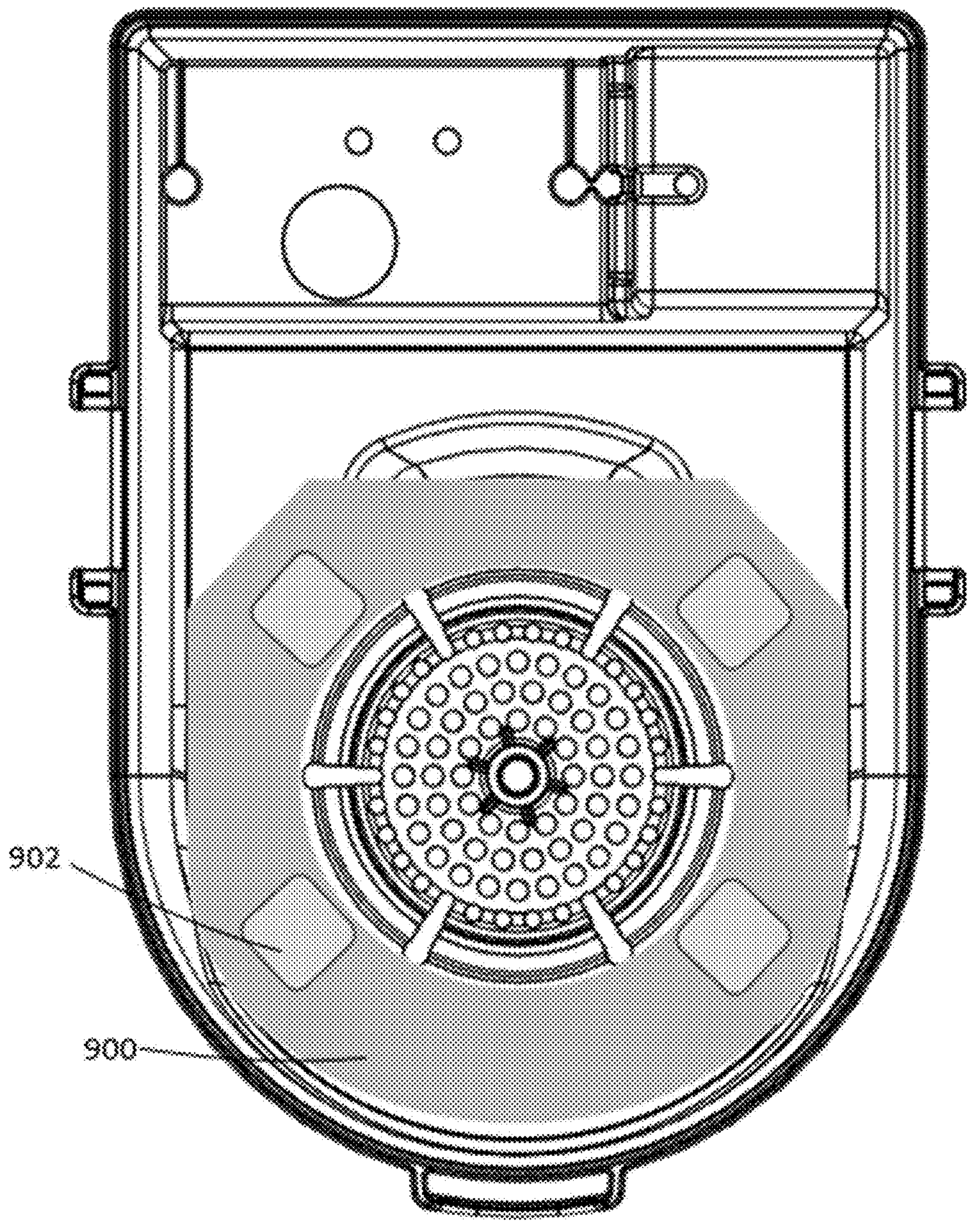
FIG. 29 is a bottom view of a dispenser unit incorporating the embodiment of the inventive sensor ring shown in FIG. 27.

Yet another embodiment of the present invention is shown in FIGS. 27-29. The present embodiment is essentially a hybrid between the disclosed ring and bar sensor types of sensors, for installation underneath the top section of a dispenser. With reference to FIG. 27, ring sensor 900 can use multiple sensors installed in the ring similar to bar 800, and in preferred embodiments each sensor is positioned under an area of the housing that is thinned out to provide flexion and allow force concentrator 901 to make contact with the dispenser top section. The force applied to force concentrator 901 is transferred to the sensor embedded in the present embodiment of ring sensor 900, where the sensor itself is housed in enclosure 902 shown on the bottom section of 900 (see FIG. 27(B)). In the present embodiment, multiple TE CONNECTIVITY-type sensors can be used to get an average load, or 1 to 4 strain gauges can be used to create a Wheatstone bridge configuration. FIG. 27 illustrates a 4 strain gauge configuration, thus a full-bridge, that can use strain gauge elements. This configuration is similar to a typical scale. In preferred embodiments, sensor 900 can mount to the bottom section of a dispenser, thus supporting the top section as shown in FIGS. 28 and 29.

As described above, in some embodiments, sensor electronics may be connected to the sensor 105 inside the one or more embodiments of exterior sensor housing, 200, 400, 500 by wires fed through through-holes in the sensor housing. In other embodiments, connection between the sensor housing, 200, 400, 500 and the sensor electronics could be by wireless means, such as Bluetooth, WIFI, LoRa or other wireless protocol known in the art, whereby installation only requires dropping one or more sensor rings 200 into the top of the dispenser or other receptacle into which the product will be placed, or installing the sensor bar 400, 500 via tapped holes 405, 504, and mounting the sensor electronics either locally to the dispenser or remotely. In yet another embodiment, the sensor electronics can be eliminated completely in favor of an existing Internet/Intranet/Bluetooth enabled device (such as a laptop, industrial PC, PLC, wireless receiver, or mobile phone) that can receive wireless signals directly from the sensor(s) 105 and process them forward to operator output as described herein. In yet another embodiment, the sensor electronics, as described herein, can be integrated directly into the sensor housing, 200, 400, 500. It will be understood by a person having ordinary skill in the art that elimination of the wired means of connection between the sensor 105 and the sensor electronics will also alter the interior configuration of the sensor housing, 200, 400, 500, and could result in the elimination of the holes and passage for egress of the wires described with reference to other embodiments.

Sensor 105 operates by outputting a resistance value with resistance decreasing as the load increases. One or more circuit design options to work with sensors 105 are known in the art, such as those provided by sensor manufacturer Tekscan. An exemplary circuit is shown in FIG. 5.

Output from the sensors 105 is transmitted to the (preferably externally mounted) sensor electronics which receive the sensor output, perform calculations as will be described, preferably store the received and calculated data and provide an output visible by an operator, either on the device itself through a GUI located directly on the exterior of the electronics mounting box, or at a remote terminal. In preferred embodiments, the system allows for viewing of the outputted data on a remote device (such as a computer, laptop, iPad or cell phone) via a cloud application (e.g., by using cellular or satellite transmission to send data from the ring sensor/sensor electronics directly to the cloud) and/or via a wireless connection such as Bluetooth, WiFi, LORAWAN, or any other wireless protocol now known or hereafter developed. For example, ring sensor electronics from one or more sensor(s) 105 can communicate to a gateway device that can aggregate the data from multiple dispenser units and push this aggregate data directly to the cloud.

In the above-described embodiments, the inventive configuration of sensor ring 200 and/or sensor bars 400, 500 allows the automatic collection of several useful measurements, which can advantageously be used for operations such as: (1) automated continuous or periodic monitoring of chemistry product level (tracking the fill), (2) automation of chemistry product re-ordering (automated inventory management), (3) detection of operational malfunctions and anomalies in the operation of the dispenser, and (4) deciphering the chemical dosing concentration based on the solid product consumption per spray cycle, i.e. X lbs. dissolved/N spray cycles, where a spray cycle represents a measurable volume of liquid, to get an average solid product concentration dissolved among others.

Tracking the fill is one way in which the inventive system can detect anomalies and deduce information on the concentration of the dissolved solid. By using the inventive device(s) and system, fill level for solid (or liquid) chemistry can be determined and tracked via a straightforward calculation which accounts for the mass/density of the chemistry and desired level before refill level, in which case the system can be automatically programmed to output "refill" or "empty" signals, in combination with a graph or other visual report of amount of chemistry used over time. In addition, the fill status of the water reservoir (that is, the area of the dispenser which houses already dissolved chemistry in water, ready for dispensing into the processing line) can be tracked by one or more methods known in the art, including direct measurements on the reservoir level using, for example, ultrasonic, capacitance, LIDAR, eTAPE, float switch, pressure sensor, optical switch, or gravimetric measurement (or other methods known in the art) from load cells installed on the reservoir or whole unit. Alternatively, monitoring the water feed supplied to the spray using a flow switch, pressure sensor, or flow meter can also be used to track the reservoir fill cycles. The system could also be connected to an automated ordering system, which sends a message to the operator and/or directly to the product supplier when additional product is needed for a refill, as described in more detail below.

In cases where the inventive sensor 105 is mounted below a volume of water, support ring (in the case of ring sensor 200), top section 601 of the dispenser (in the case of sensor bars 400, 500), or wherein the chemistry is contained in a bottle or other housing having a weight, the system can be programmed to subtract these weights to provide an accurate reading of the amount of chemistry in isolation present above the sensor. This could be done in combination with water volume output readings from the sprayer that are also fed into the inventive system. Additionally or alternatively, in one embodiment of the present invention utilizing ring sensor 200, a system that accounts for the weight of bottles or other containers that house the solid or liquid chemistry can operate with an additional sensor (such as an optical sensor) on the top surface of ring 200 or elsewhere in the dispenser that detects the type of chemistry being loaded into the dispenser by barcode, QR code, color coded, RFID or NFC tag or physical surface features and provides this information to the system. In some embodiments, the inventive system can include a means to generate and/or print labels, readable by the inventive system, which could be adhered to bottles or discs of chemistry before their insertion into the dispenser. In other embodiments, the system can be programmed to read codes or tags that are placed on the bottle or disc by the manufacturer.

Another novel capability of the inventive system is using the product consumption sensor in combination with different data streams to enhance detection of operational malfunctions and anomalies. The additional data sources collected by the inventive system (either manually, by operator input, or automatically, by one of the transmission means identified above with respect to sensor(s) 105 or known in the art) can include sensors installed on the dispenser as well as any data collected by any monitoring or control system installed in the facility in which the inventive sensor(s) are deployed (including, in embodiments, a leak or overflow and/or capacitance sensor). Other possible or auxiliary measurement devices to which the inventive sensor(s) can be operatively connected include, but are not limited to: pH sensors (at any location along the processing line, or in the dispenser itself); one or more pumps in the system or processing line; one or more fluorometers; one or more thermometers or other means of collecting temperature measurements; one or more chlorine probes, one or more capacitance sensors, one or more spray valve on/off indicators, etc. Measurements pertaining to conditions in the system and/or dispenser can be collected directly or indirectly from one or more of the above-named auxiliary measurement devices or other sensors known in the art. For example, an on/off condition of a spray valve which sprays liquid into the dispenser/onto the product can be detected by a smart valve, or by the liquid level and/or change in liquid level in the dispenser, which may be detected by a capacitance sensor or other means. Anomaly detection examples include chemical feed failure, feed overflow, or solid dissolution rate greater or lower than an acceptable value. For example, identifying a chemical feed failure is determined from pump status data in combination with the solid product consumption data produced by the inventive device and system. Pump status is defined as the on/off state of the pump where the pump can operate in a scheduled time mode, i.e., scheduled to turn on for a set time, or enabled based on a measured process variable, e.g., using a traced product and setpoint. Examples of actions that can be triggered by the inventive system include adding oxidizer to maintain a setpoint level measured by an ORP probe and/or free chlorine probe, dosing makeup water with a treatment chemistry, e.g., corrosion inhibitor, or adjusting the pH of one or more supply lines by adding an acid or a base, based on the level of water added. Combining the pump status with the chemical consumption provides insight on whether the chemistry is being dosed and if the dosing rate is acceptable or not. One example of a dosing failure is comparing the historical pump on time data with the solid product consumption trend. If the solid product consumption is flat, i.e., slope=0 showing no observed solid product consumption, but the dosing pump state is enabled, this could indicate a problem with either the feeder or the dosing pump. This scenario would trigger a root cause analysis using additional available data such as solid feeder reservoir status or process sensor(s), e.g., pH, ORP, and/or conductivity, to identify the underlying problem. The root cause analysis could be done automatically by the inventive system upon sensing the trigger condition, and the result output for the operator's review, or the root cause analysis could be done manually by the operator after receiving an alert from the system that the triggering conditions have been met. For example, if data shows the spray water reservoir is getting filled but solid product consumption is not changing, this could indicate a problem with the spray nozzle or water delivery system to the solid feeder. This scenario could also indicate a solid product sensor failure. By combining the different connected data sources and using analytics with data, the inventive system allows tracking the chemical delivery system performance, detecting anomalies, and conducting a root cause analysis, thereby streamlining maintenance and service operations. Key to this process is collecting the pertinent data from the liquid/solid feeder, chemical dosing system, and process measurements.

As another example, the combination of dosing pump on/off status along with the product consumption data can be used to detect a dosing anomaly. In this case, if the chemical consumption is not changing and the dosing pump is operating, then an alert may be triggered for a maintenance check. Based on the information collected from the data, a decision tree can be used to identify what needs to be checked—again, the system could be programmed to implement the decision tree and output an alert to the operator to check a specific aspect of one or more pieces of equipment. Here, a service request would suggest to check if the dosing pump is primed, or inspect the feed water system on the dispenser (e.g., for feed water failure and/or feed water overflow). The inventive system thereby provides a means for early detection of problems and streamlining the service procedure by identifying and recommending check points. Moreover, visual sensors (such as still or video cameras) mounted in various areas of the processing line in which the inventive system is installed (or mobile still or video cameras as are now known or may be developed) can be integrated into the inventive system to provide immediate feedback in the case where a manual visual check of specific equipment would otherwise be needed.

In one embodiment of the invention, utilizing a ring sensor 200, averaging of the three force sensors 105 is used to address cases where the signal IO capacity is limited. Alternatively, the preferred approach is to monitor each sensor signal with the averaged value also being measured simultaneously or calculated. This approach has the advantage of detecting an imbalance in the load, which could indicate one or more abnormalities with the dispenser system. For example, the solid dispenser of the type shown in FIG. 1 uses a water spray that contacts water to the solid material, which dissolves the material, and collects with the dissolved material in the bottom reservoir. If the spray is asymmetric, it will not uniformly contact the solid; only a small portion of the solid will be contacted by the spray. This could indicate a blockage or clog in one or more of the spray nozzles. In this case, only the area of the block in contact with the spray will dissolve and the asymmetry in the dissolved area will show up as an asymmetry in the measured load. Because of the nature of the dissolving process some imbalance between the sensors is expected and will be random. However, if there is consist imbalance, i.e., a pattern develops, then identifying such an anomaly can trigger an alarm for a maintenance inspection and service. The inventive system can be pre-programed to provide this type of alarm or data to the operator.

Figure 8:
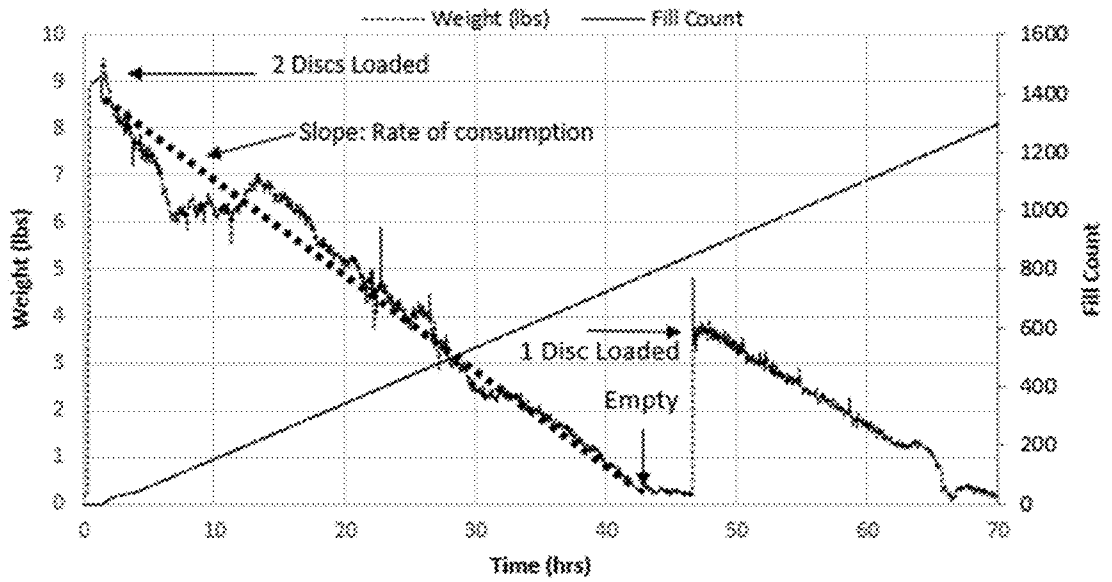
FIG. 8 is a graph showing product weight trend from sensor ring and fill count starting with two discs and then loaded a single new disc in accordance with an exemplary embodiment of the present invention.
Figure 9:
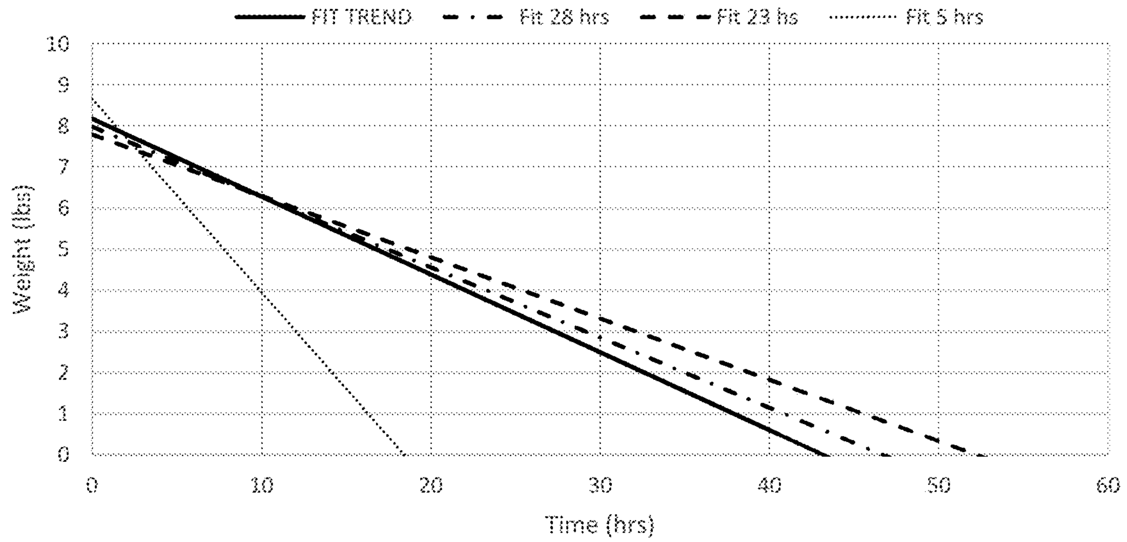
FIG. 9 is a graph showing a rate of consumption analysis at different time periods for the data shown in FIG. 8 that starts with two discs.

Yet another novel capability of the inventive system is means for automatic inventory management. In this case, tracking the consumption of the solid or liquid product allows forecasting of when the feeder should be reloaded. Forecasting is made by taking the slope of the solid or liquid weight change or percent change over a time or fill cycle period, as described above. FIGS. 8 and 9 illustrate this principal using the inventive system comprising a ring sensor 200 and solid discs of chemistry. The slope can be dynamically calculated as product is consumed. The trend in FIG. 8 starts with two discs loaded. Loading the two discs in the dispenser is automatically identified by the change in the sensor ring response. This information can be communicated electronically to an inventory management and ordering system, e.g., SAP, to indicate two discs have been removed from inventory and put into service. If the site inventory only had four discs available to start, removing two to fill the dispenser would reduce the onsite inventory by two. If this level is below a safety margin, then an automatic order can be triggered to restock the product. Even further automations of the inventive system can be envisioned, such as a robotic means for depositing another bottle or disc of chemistry from an existing inventory into the dispenser when the "refill needed" indicator is triggered. Moreover, the inventive system can integrate with a third-party system to receive weather service data which, combined with historical consumption rate data of solid or liquid chemistry in the feeder, can improve forecasting product usage to address supply chain demands.

Moreover, in some embodiments, the inventive system can incorporate predictive analytics capabilities which can be used to generate insights related to sensor calibration, predictive maintenance, and determine days to empty (DTE) for the chemistry in the dispenser. In one exemplary embodiment, predicting DTE could be performed by a process of cleaning the data received from the sensor(s) (if needed) and calculating the slope over a defined period, e.g., 24 hours, to obtain a daily consumption rate. The daily consumption rate can be extended to average consumption for 7 and 15 days. DTE may then be calculated as follows:

$$DTE = \frac{\text{Latest weight remaining}}{\text{Average 7 day consumption}}$$

In another example, a method of tracking product consumption comprises tracking the number and duration of fill cycles. In embodiments utilizing a level sensor, the level sensor can track the number of fill cycles where a fill cycle is defined as the water spray event dissolving solid product that is collected in the reservoir. A fill cycle is the only time that the solid weight will change due to the product being dissolved from the impact of the water spray. Dynamic monitoring of fill cycles which captures the start and end time of each cycle can provide additional data to the system and insight on the rate of reservoir fill. For example, stability of the fill time can be a reflection on the water flow that can be affected by water piping, e.g., a leak or large drop in pressure would cause a decrease in fill time, or nozzle spray becoming partially blocked or clogged. The inventive system can provide an alert on any of the above scenarios to notify an operator to inspect the system for malfunctioning components. Alternatively, filling the reservoir too quickly could indicate a change in the water supply line pressure, or an internal water line delivery malfunction such as line leak or spray nozzle problem. For stable water delivery conditions (flow and pressure), the number of spray cycles on a given solids product will correlate to the solid product usage within a range or ±N cycles. This information is complementary to direct consumption rate monitoring and can be used by the inventive system to estimate when a refill is needed and DTE.

Yet another novel capability of the inventive system is deciphering the chemical dosing concentration based on a solid product consumption per spray cycle, i.e. X lbs. dissolved/N spray cycles, where spray cycle represents a measurable volume of liquid, to get an average solid product concentration dissolved. A measure of the average concentration allows applying additional control automation on the feeder to adjust the average concentration to accommodate process demands. For example, the spray jet momentum, pressure, pH, or water temperature can be adjusted to increase or decrease the dissolution rate of a solid product, thus changing the concentration level in the feeder reservoir. The spray jet momentum can be controlled using a control valve to change the water flow rate to the spray nozzle or adjusting the water pressure. Higher temperature water will increase the dissolution rate of the solid product, thus, monitoring the water temperature and having a means to adjust the temperature can also be used to change the concentration. As the inventive system tracks and stores chemical concentration in the dispenser reservoir over time, it can provide another means of anomaly detection. For example, deviation in the dissolved solid concentration could indicate a change in the inlet water quality, e.g., temperature increase or decrease, different water source, or spray nozzle malfunctioning.

The sensor circuit is housed in an enclosure and mounted on or near the dispenser with a 6-conductor cable used to connect each sensor to the circuit. Signal collection from the electronics can include 4-20 mA or 0-5 V hard wired to a logging device, e.g., PLC, or can incorporate a wireless communication protocol such as Bluetooth, Wifi, LoRa, cellular, satellite, etc. Implementing a wireless protocol has the advantage of reducing installation complexity by eliminating cables as well as not being constrained by limited IO capacity of logging devices. The force sensors and circuitry is also a low power (<0.5 mW) consuming device making it well suited for battery operation or alternative energy harvesting methods such as solar, thermal electric generation (TEG), vibration, etc. Furthermore, the measurement sampling rate can be low since the product consumption time scale is long. While continuous or periodic measurements, and their rate, can be selected based on design choice, taking a measurement once an hour or less is acceptable to further help increase the battery life. In some embodiments, the system can include a means for recharging the batteries in the sensor or sensor electronics by, e.g., tapping into the pump power when activated. For example, in an exemplary processing line, a pump controlling water fill of a given dispenser is controlled by a relay (120V) from the main controller. In this example, the pump is located on or near the dispenser. When dosing is enabled, power to the pump is provided from the main controller. Tapping into the power of this exemplary pump, or other power sources in the vicinity, depending on the application of the inventive device, could provide a means to recharge batteries used on the sensor electronics.

As can be seen, the inventive system comprising one or more sensor(s) and, in embodiments, software and/or ancillary measurement or control devices operatively connected thereto, provides these and other benefits over the prior art: (1) 24/7 visibility of the product level in the dispenser and consumption rate history, enabling forecasting of the time to empty for efficient scheduling of refills and maintaining onsite inventory; (2) ability to identify product usage anomalies by tracking the consumption rate of chemistry; (3) enabling pump malfunction alarming; (4) reservoir overflow detection and alarming; (5) tracking the number of reservoir refills, which can closely correlate to the consumption rate; (6) identifying when product is added to the dispenser, which can also provide a calibration or self-calibration check; (7) tracking product inventory onsite, and alerting at critical levels; (8) being adaptable to small packaged liquid treatment products, as well as solid and liquid chemistries; (9) modular system allowing flexible configuration of multiple dispensers to a single controller; and (10) an off-the-shelf solution that can be retrofit onto multiple types of existing dispensers.

In use, the inventive system can provide at least the following outputs, related to the dispenser itself, to the user in real-time or near-real-time: (1) reservoir level; (2) accumulated fill count; (3) refill rate; (4) daily concentration trend; and (5) dosing volume (daily, weekly, etc.). Further, the system can provide data and/or reports related to the overall performance and health of the dispenser, and related inventory, with at least the following data types: (1) onsite solid (or liquid) product inventory; (2) product usage over reported period (#discs, #bottles, lbs.); (3) running tally for lbs. product per day, week, or month; (4) days to empty (DTE); (5) number of overflow alarms and duration; (6) number of low-low and low product alarms; (7) number of refill cycles; (8) running average on refill cycles per lbs. product used; (9) summary of all alarms and insights; (10) consumption rate not matching pump on-time; and (11) consumption rate too high or too low compared to past historical data. Data, alarms and/or reports related to the following conditions could be provided or output by the system: (1) low-low product weight; (2) low product weight; (3) reservoir overflow; (4) dosing malfunction (e.g., no change in reservoir volume for an integrated pump on period); (5) low reservoir; (6) low product inventory; (7) product consumption rate too high; (8) product consumption rate too low; (9) weight sensor(s) disconnected; (10) level sensor disconnected; and/or (11) weight sensor reading too high.

Example 1

Figure 6:
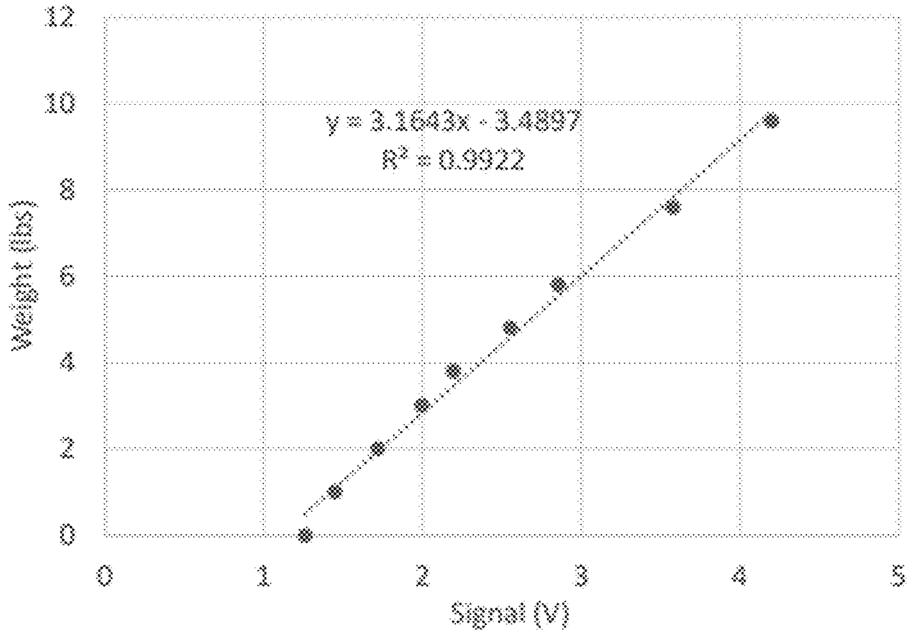
FIG. 6 is a graph showing the result of a calibration of the inventive sensor ring 200 in accordance with an exemplary embodiment of the present invention.

To illustrate the functionality of one embodiment of the present invention, utilizing an inventive sensor ring 200, and corresponding system, a test performed on the Ultra-m dispenser (manufactured by AP Tech Group) using standard solid chemistry inhibitor disc products, and outfitted with the sensor ring 200 according to one embodiment of the present invention, is presented with reference to FIGS. 6-9. The dispenser is set up for automated testing that consists of the following steps: (1) initiate the water spray against the disc, (2) static delay time, i.e., idle and do nothing for set amount of time, (3) drain the water plus dissolved chemistry from the reservoir, and (4) repeat the cycle. In the present example, the spray reservoir fill is controlled by the dispenser using a float to turn the water spray on or off. Prior to operating with the disc, the ring sensor was calibrated in-situ using a range of weights placed on the grate that sits above the sensor ring. The calibration result, shown in FIG. 6, is linear over a weight range from 0 to 10 lbs. With no load on the sensor ring a voltage of around 1.2 V is observed. This voltage is due to both the characteristics of the non-inverting op-amp circuit and the sensors being preloaded, i.e., the sensors are in contact with the force concentrator. Preloading the sensors provides better linearity at low load levels, e.g., <3 lbs., because, in this example, the sensor response is dependent on the flexion of the ring and slight preloading ensures the sensor is in contact with force concentrator.

Figure 7:
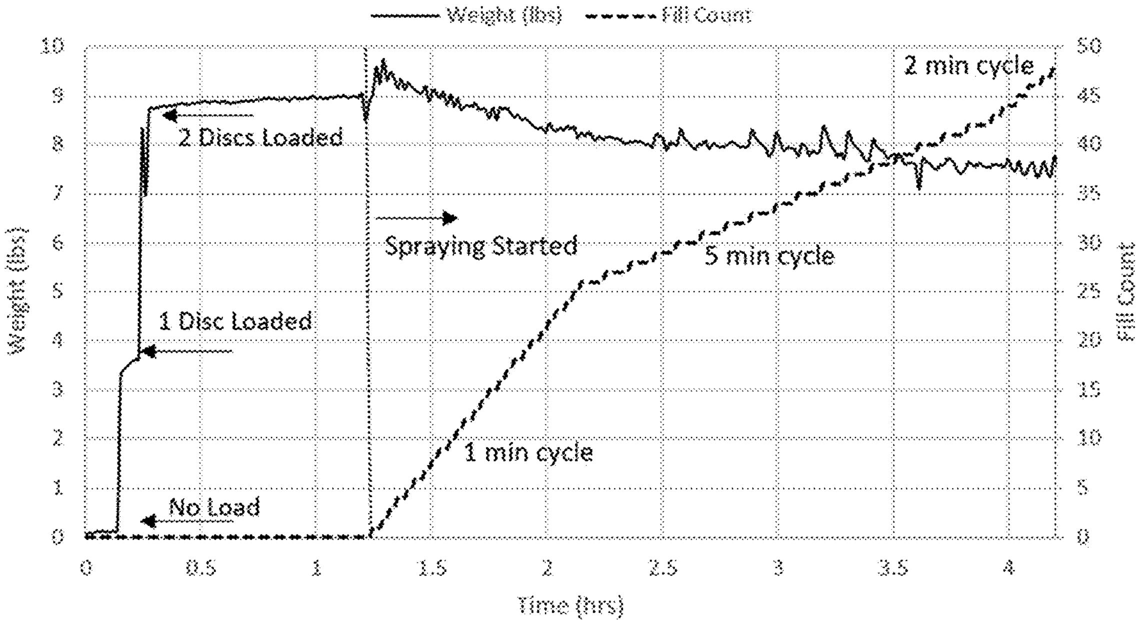
FIG. 7 is a graph showing the sensor ring trend for initial product disc loading in dispenser with spray enabled and accumulated fill count being tracked in accordance with an exemplary embodiment of the present invention.

Results obtained using the inventive sensor ring 200 in the above-described exemplary automated dispenser system are shown in FIGS. 7 and 8. Disc loading was done in two steps to identify the sensor ring response for each disc loaded, as indicated on FIG. 7. Product loading in the dispenser, whether discs or bottles, is at a known weight. In this case, the disc weight is 4.8 lbs. each. However, the actual weight observed for the 1st disc loaded is around 3.8 lbs. and the 2nd added is closer to 5 lbs. This discrepancy in absolute weight is attributed to the tight fit and tapered walls in the dispenser for loading discs and the soft tacky disc composition. As a result, the first disc inserted can make contact with the walls causing an observed discrepancy between the true disc weight and loaded weight. Nevertheless, because the discs are at a known weight, the addition of discs into the dispenser can be considered as a calibration because the zero value will not change and the sensor ring response will be linear over the full range, i.e., maximum signal detected for N discs loaded. Therefore, the operation of the ring sensor in this embodiment can be considered self-calibrating when the added load weight is known. Alternative to using weight, the percent fill can be used. For example, for each disc added will increase the fill level by 25% since the dispenser maximum disc capacity of the dispenser used in this example is four. Finally, the system can be manually calibrated by scanning, by an operator, a QR code associated with the dispenser and one or more solid or liquid products to create a data association and time stamp for when and how may discs (or single bottle) are added.

After loading the discs, the first four hours of the run is expanded in FIG. 7 to highlight the disc loading and initiation of the water spray starting at 1.3 hours. The starting condition for the water spray used a 1 min delay, i.e., the reservoir fills and then stays idle for 1 minute before draining and repeating the cycle. Each cycle is counted as one fill with the accumulated fill count being tracked as shown in FIGS. 7 and 8. Tracking the solid product weight or percentage can be time based (x-axis) as show in FIGS. 7 and 8 or based on the fills by replacing the x-axis scale with the accumulated fill count.

The complete trend in FIG. 8 indicates the solid product approaches 0 lbs. around 45 hours and at hour 47 a new disc is loaded as indicated by the sharp transition from 0 to 3.8 lbs. After loading the new disc the spray cycle resumed. The product consumption, calculated as the slope, can be dynamically calculated. The consumption rate is useful to forecast when the feeder requires reloading. Because of artifacts in the data, i.e., incomplete or nonuniform contact, the accuracy of the consumption rate calculation will improve as data collection increases. FIG. 8 illustrates this for the initial two-disc loaded condition that shows an initial high consumption rate and then plateauing between hours 7 and 11. In this case the plateau is suspected to be from the discs getting wedged on one side of the feeder, thus not applying a normal force onto the ring sensor. As more date gets collected, the predicted the rate of consumption improves, as illustrated in FIG. 9. Here the consumption rate is calculated at different periods of the run with the solid FIT TREND line calculated from the linear fit for all the data collected from start to finish for the 2 discs. A similar analysis for the disc loaded at hour 47, indicates that a consumption rate calculated after the first 5 hours of data collected is within 1 hour of the empty state actual empty state.

Figure 11:
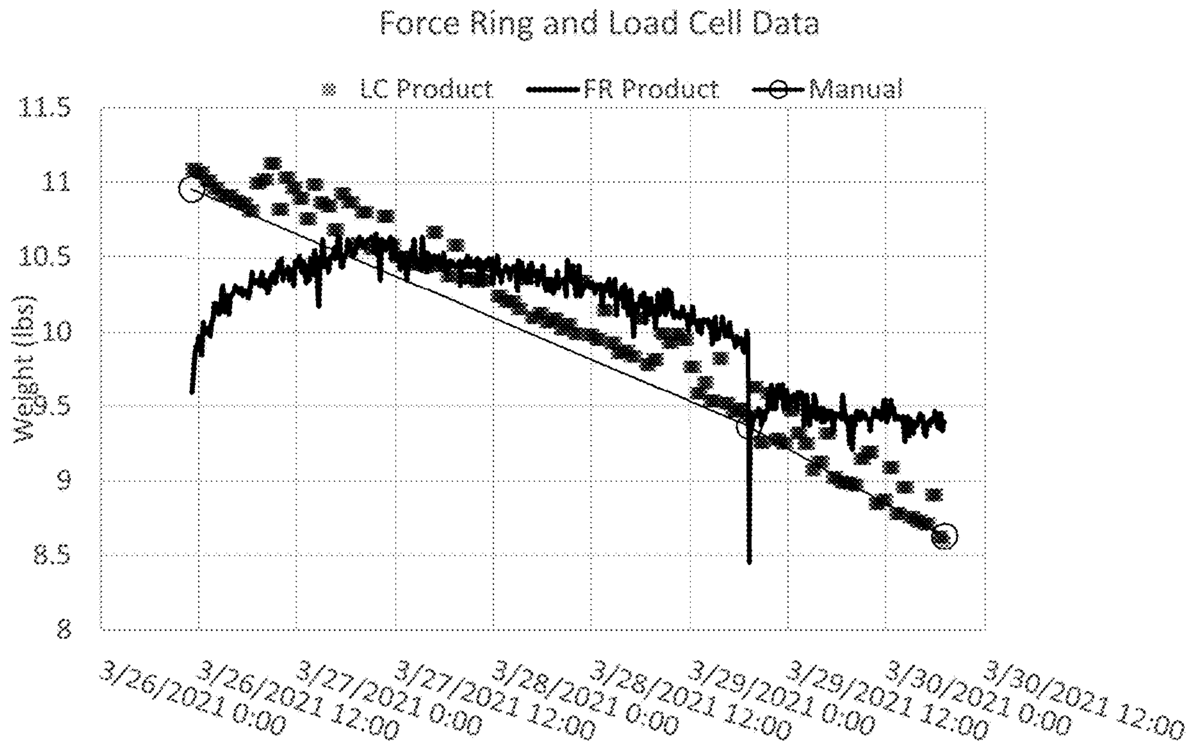
FIG. 11 is a graph showing the use of a fitted model to correct for any drift inherent in a given sensor, according to an embodiment of the present invention.
Figure 13:
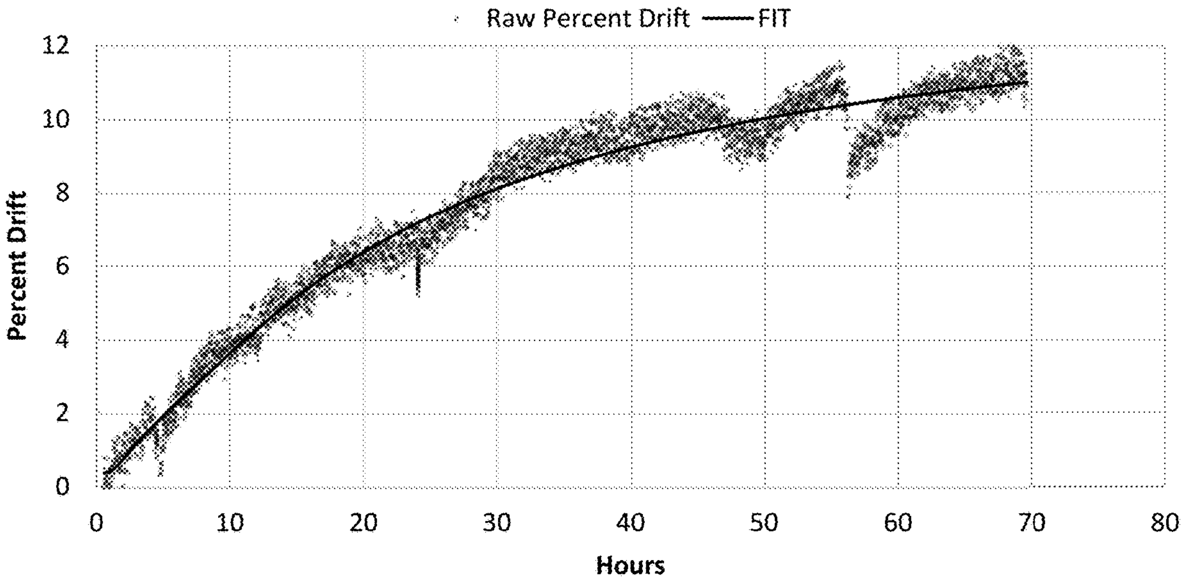
FIG. 13 is a graph showing the results of application of a fit line in one experimental example.

Some sensors which could be used in connection with the present invention have a characteristic drift, i.e., when a load is applied and is static, the output resistance will slowly increase over time. Most solid and liquid chemical dispensers dispense chemicals at a very slow rate, and thus the weight change of the product is low over time, and the drift issue becomes more apparent. FIG. 11 illustrates the effect of sensor drift by comparing the solid product weight change between load cell measurements and the thin film force sensor in an experimental example. In this case, the load cell measurement is conducted with the load cells mounted external to the dispenser, thus tracking the weight of the complete dispenser that includes solid product, water, and dispenser shell and hardware. To track the weight of the solid product consumption, corrections may be applied to remove the water weight. Additional measurements can be made by removing the bottle product from the dispenser to weigh the bottle on a bench scale (manual measurements are indicated by the dots on FIG. 11), then replacing the bottle in the dispenser to continue with the online measurement. As shown in FIG. 11, in this experimental example, both the load cell and offline weight measurements are in good agreement. The thin film sensor in this experimental example detects a weight change, but the rate of change is not as sensitive as the load cell measurement because of the inherit drift, which may be present in some thin film sensors of the type that can be used for this invention. Accordingly, the system of the present invention can also incorporate a drift correction model which can be developed by, for example, using sensor 200 under a static load for a long duration. In preferred embodiments, the inventive system develops a correction model using the percent change in signal fitted to a double exponential function based on a unit of time that sensor 200 is exposed to the load. Exemplary fit results from one experimental example are shown in FIG. 13. This exemplary data was collected by using sensor 200 with a static load (9.6 lbs) collected for a 70 hour period.

Fit results from the static test in this exemplary embodiment may be calculated as follows:

$$\text{Percent Drift} = \text{offset} + A\exp^{\left(\frac{B}{Cx}\right)} + D\exp^{\left(\frac{E}{Fx}\right)}$$

Where x is the hours sensor 200 is loaded with a weight and A, B, C, E, D, and F are parameters from the fit shown in table 1 and x is the hours exposed to the load. The first term in the double exponential accounts for the initial change in signal whereas the second term addresses the longer duration change.

TABLE 1

Calculated drift model parameters.

| | A | B | C | D | E | F | Offset |
|---|---|---|---|---|---|---|---|
| Fit Constants | 3.45314 | 5.66857 | −1.2994 | 10.2802 | 105.975 | −4.5643 | 0.40495 |

Figure 12:
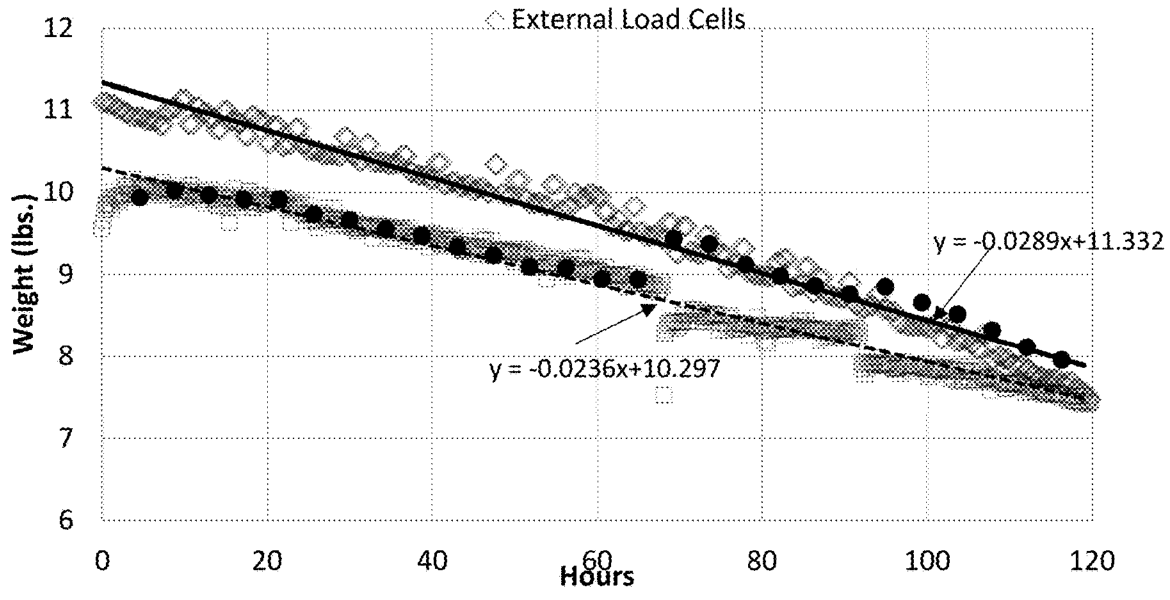
FIG. 12 is a graph showing the results of measurements taken on an exemplary dispenser after a drift correction model has been applied, according to an embodiment of the present invention.

FIG. 12 shows the results of the inventive system's application of the drift correction to sensor 200 data corresponding to the experimental data shown in FIG. 11. In this exemplary embodiment, the correction is applied to the full set of data (Ring Drift correction), i.e., even after the bottle was removed for offline weight measurement. In the second case, the drift correction is applied to the data is reset, i.e., correct restarted, for each time the bottle was removed. The drift correction is applied in real-time by applying the following:

$$\text{Corrected Signal} = \text{Raw Signal} - \text{Raw Signal}\left(\frac{\text{Percent Drift}}{100}\right)$$

Where raw signal is the measurement signal from sensor 200 and Percent Drift is calculated from the model for x hours exposed to a load.

Example 2

Figure 24:
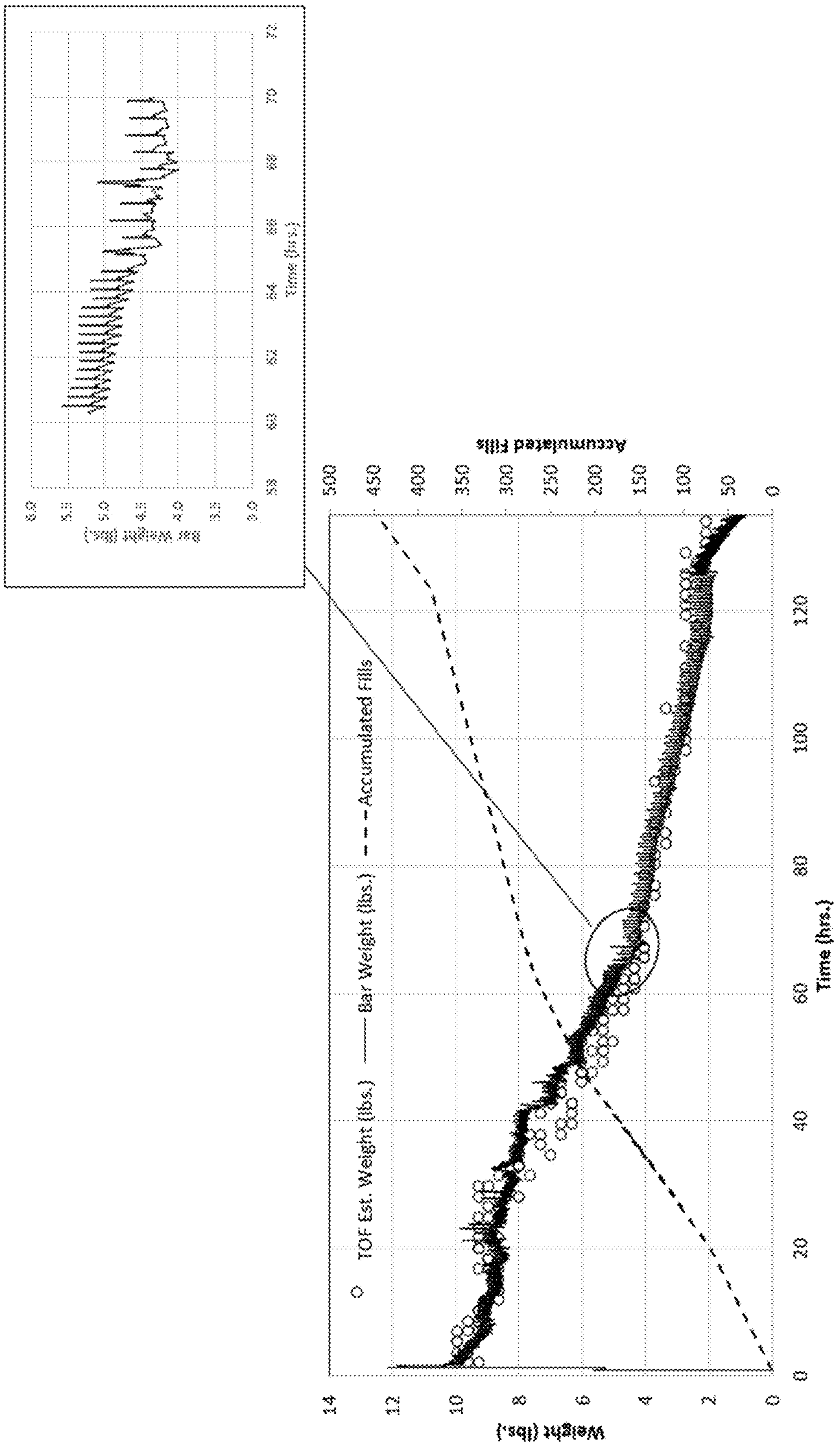
FIG. 24 is a graph showing product weight trends for a sensor bar according to one embodiment of the present invention.

FIG. 24 illustrates the results of testing completed using a center-mounted sensor bar 500 according to one embodiment of the present invention. The weight measurement is compared with a Time-of-Flight (TOF) sensor (e.g., an Adafruit VL53LOX) mounted at the top of the dispenser. The TOF sensor measures the change in distance between the sensor position and height of disc products stacked in the dispenser. In this example, two disc products are initially loaded. The disc height is 3.5 inches and weight is 5.2 lbs. Therefore, the measured height of the stacked disc products is converted to weight using the conversion factor 1.48 lbs./inch. As the discs dissolve the height decreases. The time-of-Flight (TOF) sensor is most useful with respect to solid disc products, but can suffer from anomalies caused by preferential/uneven dissolving in the center of the discs. In this case, the correlation between the change in height and weight will deviate.

This application is therefore intended to cover any variations, uses, or adaptations of the invention using its general principles. Further, this application is intended to cover such departures from the present disclosure as come within known or customary practice in the art to which this invention pertains.

I claim:

1. A product consumption measurement system, comprising:

at least one sensor, said at least one sensor comprising at least one force sensor;

at least one auxiliary water measurement device capable of monitoring a condition selected from the list comprising: a volume of water in a reservoir of a solid and liquid chemistry dispenser, a fill status of said reservoir, a fill on/off status for said reservoir, a number of spray cycles into said reservoir, and/or a volume or rate of water feed into said dispenser; and sensor electronics operatively connected to said at least one sensor and said at least one auxiliary water measurement device, said sensor electronics comprising means for receiving, processing, and outputting data received from said at least one sensor and said at least one auxiliary water measurement device;

wherein said at least one sensor is sized and shaped for retrofit application to said solid and liquid chemistry dispenser;

wherein said at least one sensor further comprises a water-tight, sealed housing surrounding said at least one force sensor;

wherein said housing further comprises at least one force concentrator, each of said at least one force concentrators in physical connection with, and either directly above or directly below, one of said at least one force sensors;

wherein a material comprising said housing has a first thickness in an area in an immediate vicinity surrounding said force concentrator, and a second thickness in the remainder of said housing, wherein said first thickness is less than said second thickness; and wherein said at least one sensor exhibits chemical resistance.

2. The product consumption measurement system of claim 1, wherein said at least one force concentrator comprises a raised area on a surface of said housing each corresponding to an interior location of one of said at least one force sensors.

3. The product consumption measurement system of claim 1, wherein said sensor electronics are operatively connected to an inventory management system, and wherein said sensor electronics further comprise means for outputting inventory data to said inventory management system.

4. The product consumption measurement system of claim 3, wherein said means for receiving, processing, and outputting data comprises a processor running software programmed to perform the following steps:

receive data from said at least one sensor;

translate said data received from said at least one sensor into a quantity of product remaining in said dispenser; and output said quantity to an operator.

5. The product consumption measurement system of claim 4, wherein said software is further programmed to perform the following additional steps:

output said quantity to said inventory management system, whereby said inventory management system can use said quantity to send a request to a supplier to request reorder of a needed quantity of said product.

6. The product consumption measurement system of claim 4, wherein said software is further programmed to perform the following steps additional steps:

employ an inventory forecasting model to determine a timeframe during which a reorder of said product will be necessary, based on at least said data received from said at least one sensor.

7. The product consumption measurement system of claim 1, wherein said at least one auxiliary water measurement device includes means to directly or indirectly measure a spray valve on/off condition.

8. The product consumption measurement system of claim 1, wherein said means for receiving, processing, and outputting data comprises a processor running software programmed to perform the following steps:

receive data from said at least one sensor;

receive data from said at least one auxiliary water measurement device;

use said data from said at least one sensor and said data from said at least one auxiliary water measurement device to check for one or more potential anomalies in said system; and if one or more anomalies is found, provide an output to an operator indicating the presence of said one or more anomalies.

9. The product consumption measurement system of claim 8, wherein said one or more potential anomalies is selected from a group comprising: feed water failure, feed water overflow, solid dissolution rate greater than an acceptable value, solid dissolution rate lower than an acceptable value, sensor failure, dosing pump failure, or full or partial blockage in one or more spray nozzles.

10. The product consumption measurement system of claim 1, wherein said means for receiving, processing, and outputting data comprises a processor running software programmed to perform the following steps:

receive data from said at least one sensor;

receive data from said at least one auxiliary water measurement device; and determine a concentration of said product dissolved in a reservoir of said dispenser based on said data received from said at least one sensor and said data received from said at least one auxiliary water measurement device.

11. The product consumption measurement system of claim 10, wherein:

said sensor electronics are operatively connected to one or more control valves operatively controlling one or more of the following: momentum of one or more spray jets feeding into said dispenser, water temperature of water entering said dispenser, adjust water pH level by addition of acid or base; and wherein said software is further programmed to output a control signal to said one or more control valves to change a temperature, momentum, or pH of water entering said dispenser in response to said concentration of said product dissolved in said reservoir.

12. The product consumption measurement system of claim 1, wherein said at least one sensor is self-calibrating.

13. The product consumption measurement system of claim 1, wherein said sealed housing is in the shape of a ring.

14. The product consumption measurement system of claim 1, wherein said sealed housing is in the shape of a bar, said bar having exterior dimensions corresponding to interior dimensions of said solid and liquid chemistry dispenser.

* * * * *